US011163686B2

(12) United States Patent
Sun et al.

(10) Patent No.: US 11,163,686 B2
(45) Date of Patent: Nov. 2, 2021

(54) METHOD AND APPARATUS FOR ACCESSING TENSOR DATA

(71) Applicant: Beijing Horizon Robotics Technology Research and Development Co., Ltd., Beijing (CN)

(72) Inventors: Chen Sun, Beijing (CN); Zhenjiang Wang, Beijing (CN); Liang Chen, Beijing (CN); Kun Ling, Beijing (CN)

(73) Assignee: Beijing Horizon Robotics Technology Research and Development Co., Ltd., Beijing (CN)

( * ) Notice: Subject to any disclaimer, the term of this patent is extended or adjusted under 35 U.S.C. 154(b) by 141 days.

(21) Appl. No.: 16/715,127

(22) Filed: Dec. 16, 2019

(65) Prior Publication Data
US 2020/0192803 A1    Jun. 18, 2020

(30) Foreign Application Priority Data
Dec. 17, 2018    (CN) .......................... 201811541065.1

(51) Int. Cl.
    *G06F 12/08*     (2016.01)
    *G06F 3/06*      (2006.01)
    *G06F 12/0868*   (2016.01)
    *G06F 12/10*     (2016.01)
    *G06N 3/063*     (2006.01)

(52) U.S. Cl.
    CPC .......... *G06F 12/0868* (2013.01); *G06F 12/10* (2013.01); *G06F 2212/1024* (2013.01); *G06F 2212/608* (2013.01); *G06N 3/063* (2013.01)

(58) Field of Classification Search
    CPC .......... G06F 2212/1024; G06F 12/608; G06F 12/0893; G06F 12/0864; G06F 12/0207; G06F 12/0292; G06F 12/0868; G06F 12/10; G06F 3/0659; G06F 3/0604; G06F 3/0656
    See application file for complete search history.

(56) References Cited

U.S. PATENT DOCUMENTS

| 8,761,206 | B1  |   | 6/2014 | Zhu et al. |
| 9,875,104 | B2  | * | 1/2018 | Woo ................... G06F 9/30061 |
| 10,042,785 | B1 | * | 8/2018 | Buch .................... G06F 3/0674 |
| 10,175,912 | B1 | * | 1/2019 | Temam ................ G06F 3/0683 |
| 10,346,093 | B1 | * | 7/2019 | Wu ....................... G06N 3/0472 |

(Continued)

OTHER PUBLICATIONS

J. Vedurada et al., "TTLG—An Efficient Tensor Transposition Library for GPUs," 2018 IEEE International Parallel and Distributed Processing Symposium (IPDPS), 2018. (Year: 2018).*

*Primary Examiner* — Khoa D Doan
(74) *Attorney, Agent, or Firm* — Lando & Anastasi, LLP

(57) ABSTRACT

Disclosed are a method and an apparatus for accessing tensor data. The method may include determining a first row address in a first memory where one or more first data items to be accessed in a logical structure of the tensor data are stored at the first row address, copying data items at the first row address in the first memory to a first buffer row of a first buffer, moving each first data item in the first buffer row of the first buffer to a corresponding location at least in a first buffer row of a second buffer, and storing data items in the first buffer row of the second buffer into corresponding target locations in the second memory.

20 Claims, 12 Drawing Sheets

(56) References Cited

U.S. PATENT DOCUMENTS

| | | | |
|---|---|---|---|
| 2006/0195668 A1* | 8/2006 | Nakano | G06F 11/2069 |
| | | | 711/162 |
| 2008/0005514 A1* | 1/2008 | Kurokawa | G06F 3/0635 |
| | | | 711/163 |
| 2009/0327481 A1* | 12/2009 | Rickard | G06F 11/3419 |
| | | | 709/224 |
| 2010/0281192 A1* | 11/2010 | Rakib | G06F 5/08 |
| | | | 710/52 |
| 2014/0181171 A1* | 6/2014 | Dourbal | G06F 17/16 |
| | | | 708/607 |
| 2017/0323224 A1* | 11/2017 | Bruestle | G06N 20/00 |
| 2019/0042092 A1* | 2/2019 | Wu | G06F 3/0673 |
| 2019/0130291 A1* | 5/2019 | Nicol | G06N 3/105 |
| 2020/0034306 A1* | 1/2020 | Luo | G06F 12/0292 |

* cited by examiner

METHOD AND APPARATUS FOR ACCESSING TENSOR DATA

CROSS-REFERENCE

The present disclosure claims a benefit of, and priority to, Chinese Patent Application No. 201811541065.1, filed on Dec. 17, 2018, the disclosure of which is hereby expressly incorporated by reference herein in its entirety.

TECHNICAL FIELD OF THE DISCLOSURE

The disclosure relates to a method and an apparatus for accessing tensor data.

BACKGROUND

Various artificial intelligence (AI) chips have been developed for massive calculation tasks in AI applications. As AI technologies are applied in more technology fields, AI chips with higher performance are expected.

Performance of data access, including performance indicators such as data access times and bandwidth, is one of critical bottlenecks of performance of the AI chips. An improved data flow in an AI chip may improve efficiency of data access in the AI chip.

SUMMARY

In an aspect, a method for accessing tensor data is disclosed. The method may include determining a first row address in a first memory, where one or more first data items to be accessed in a logical structure of the tensor data are stored at the first row address in the first memory. The method may also include copying data items at the first row address in the first memory to a first buffer row of a first buffer. The method may also include moving each first data item in the first buffer row of the first buffer to a corresponding location at least in a first buffer row of a second buffer, where the corresponding location at least in the first buffer row of the second buffer for each first data item may depend on a target location in a second memory allocated to the first data item. The method may also include storing data items in the first buffer row of the second buffer into corresponding target locations in the second memory.

In another respect, an apparatus for accessing tensor data is disclosed. The apparatus may include a first buffer, a second buffer, and a controller. The controller may be coupled to the first memory, the second memory, the first buffer, and the second buffer. The controller may be configured to perform at least the above method according to instructions when the controller is activated.

In another respect, disclosed is a non-transitory computer readable medium having program instructions stored thereon. The stored program instructions, when being executed by a processor or a controller, may cause the processor or controller perform at least the above method.

BRIEF DESCRIPTION OF THE DRAWINGS

The above and other objects, features and advantages of the present disclosure will become more obvious by describing the embodiments of the present disclosure in more details with reference to the drawings. The drawings provide further understanding of the embodiments of the present disclosure and constitute a portion of the specification. The drawings, together with the embodiments of the present disclosure, are used to explain this disclosure but do not constitute restrictions on the disclosure. In the drawings, the same reference number generally refers to the same portion or step.

DETAILED DESCRIPTION

Figure 1:
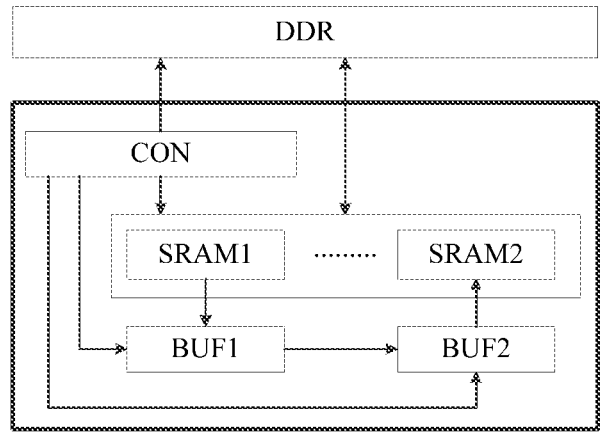
FIG. 1 shows an example system according to an embodiment.

In the example method and apparatus in the embodiments, for example, data may be read efficiently from the first memory with data alignment through the first buffer, and through the second buffer, the data items to be accessed may be adjusted efficiently according to a desired format and data may be wrote into the first memory efficiently with data alignment. Thus, an efficiency of data access within an AI chip may be improved, so that the performance of the AI chip may be improved and a power consumption of the AI chip may be reduced.

Moreover, the example method and/or apparatus in the embodiments may facilitate pipeline processing. Thus, the efficiency of data access within the AI chip may be further improved, so that the performance of the AI chip may be further improved and the power consumption of the AI chip may be further reduced.

Hereinafter, example embodiments according to the present disclosure will be described in details with reference to the drawings. It is obvious that the described embodiments are some embodiments of the present disclosure rather than all, and it is appreciated that the present disclosure is not limited to the example embodiments described herein.

Due to various aspects such as cost and chip dimensions, an on-chip memory in the AI chip usually has a limited capacity (for example from several hundreds of kilobytes to several megabytes), and is thus not capable of storing or buffering complete tensor data to be processed. Further, a component such as a convolution acceleration core usually includes a limited number of multiplier-accumulators. Thus, the AI chip is usually able to process a part of data items of the whole tensor data each time with limited hardware resources.

Due to various aspects such as limitations from hardware resources, an expectation of reduced operations (for example, in a data post-processing), an expectation of a fusion calculation for a plurality of layers of an artificial neural network, and so on, for example, the whole tensor data may be split into a plurality of portions so as to be stored respectively (for example, to store a plurality of partial tensor data continuously), or to provide a part of data items of the complete tensor data to the AI chip for processing each time.

On the other hand, due to splitting or other processes for a tensor, a splicing or combination for one or more items of tensor data may be required. For example, each local tensor output by the convolution acceleration core may be spliced or combined so as to obtain finally complete tensor data.

Thus, a possible solution may be utilizing a software capacity of a processor or controller in the AI chip so that the processor or controller may control the operations of splitting/combining/adjusting the tensor data according to predetermined instruction sequences. For example, such operations may include reading the data items of the complete tensor data (usually a part of data items due to limitations of hardware resources) from an off-chip memory into an on-chip memory, and then splitting/combining the data items read into the on-chip memory.

However, for example, such operations may increase the operation load of the processor or controller in the AI chip, and an additional delay may be brought for the other control operations of the processor or controller in the AI chip. Moreover, hardware resources cannot be utilized efficiently in such operations. For example, such operations are not suitable for a pipelining way.

Further, due to the limited capacity of the on-chip memory, additional data exchanges/transfers may be involved between the off-chip memory and the on-chip memory during the processor or controller is performing the above operations. For example, the processor or controller may be configured to control to output some intermediate processing results into the off-chip memory temporarily, so as to ensure a sufficient remaining capacity of on-chip memory for the above operations, which may cause further delays for the other operations or processes in the AI chip and may bring a degraded performance and an increased power consumption for the AI chip.

The example method and apparatus in the embodiments of the present disclosure allow for obtaining data part to be accessed from the tensor data loaded in the on-chip memory directly and according to the expected data item arrangement, so as to reduce the working load of the processor or controller in the AI chip, to reduce the data interchanges/transfers between the off-chip memory and the on-chip memory, and to utilize the limited hardware resources efficiently, for example to utilize the efficient pipeline manner, so that the performance of the AI chip may be improved and the power consumption of the AI chip may be reduced.

Although the example method and the apparatus in the embodiments of the present disclosure are described in a context of an AI chip, the example method and apparatus in the embodiments of the present disclosure are also applicable to any situations or systems where data exchanges are expected between a low-speed storage system with a high capacity (for example, the off-chip memory of the AI chip) and a high speed storage system with a low capacity (for example, the on-chip memory of the AI chip) and where the data items in the high speed storage system with a low capacity are expected to have a desired arrangement.

To facilitate the descriptions of the example method and apparatus in the embodiments of the present disclosure, an example system is shown in FIG. 1 where the example method and apparatus in the embodiments may be applied.

As shown in FIG. 1, the example system may include some components or modules or circuits or units or components in the example method and apparatus in the embodiments, such as a controller CON, a first buffer BUF1, and a second buffer BUF2.

The first memory SRAM1 and the second memory SRAM2 in the example system as shown in FIG. 1 may form a high speed storage system or a part of the high speed storage system in the example system in the embodiments.

In various embodiments, both the first memory SRAM1 and the second memory SRAM2 in the high speed storage system may be static random access storage components/modules or high-speed buffer components/modules supporting an access to two-dimensional data and/or a two-dimensional access to data.

In an embodiment, each of the first memory SRAM1 and the second memory SRAM2 may include a plurality of one-dimensional static random access memories (for example, a plurality of linear static random access memories). Storage units at the same address in each one-dimensional static random access memory may correspond to a storage row in the first memory SRAM1 or the second memory SRAM2.

For example, the first memory SRAM1 may include four one-dimensional static memories, and each storage unit in each one-dimensional static memory may be 32 bits. Accordingly, in this example, a storage row in the first memory SRAM1 may be used to store 128 bits of data, or a storage width of the first memory SRAM1 is 128 bits.

In another embodiment, each of the first memory SRAM1 and the second memories RAM2 may also be a two-dimensional memory so as to support directly an access to two-dimensional data and/or the two-dimensional access to data.

Although the first memory SRAM1 and the second memory SRAM2 are shown in FIG. 1 as two storage components/modules configured separately, the first memory SRAM1 and the second memory SRAM2 may also be two different portions of the same storage component/module supporting access to two-dimensional data, which may include a plurality of one-dimensional static random access memories or one or more two-dimensional memories so as to support access to two-dimensional data and/or two-dimensional access to data.

For example, in a case of the AI chip, the first memory SRAM1 and the second memory SRAM2 in the example of FIG. 1 may be two on-chip static random access memories or on-chip caches, and may also be two portions on the same on-chip memory which may be a storage system include one or more storage components supporting an access to two-dimensional data and/or a two-dimensional access to data.

Figure 2:
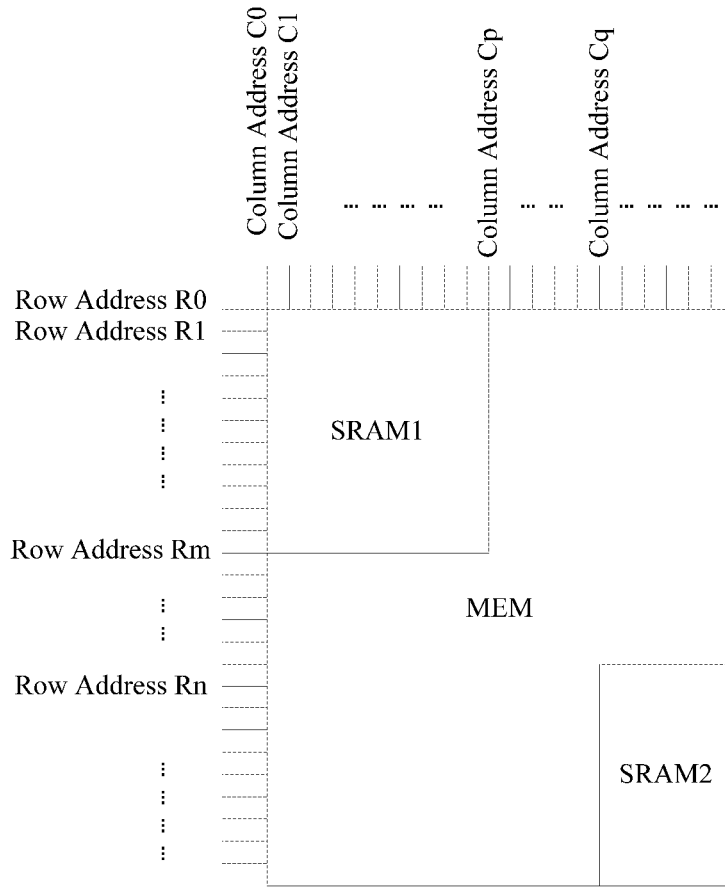
FIG. 2 shows an example on-chip memory according to an embodiment.

For example, as shown in FIG. 2, the first memory SRAM1 and the second memory SRAM2 may correspond to a portion at the top left corner (i.e., the storage region/storage portion corresponding to row addresses from R0 to Rm and column addresses from C0 to Cp) and a portion at the lower right corner (i.e., the storage region/storage portion corresponding to row addresses from Rn to the end row address and column addresses from Cq to the end column address) determined according to the on-chip memory system MEM, respectively.

Further, in various embodiments, two fixed storage components or storage regions in the high speed storage system may be used as the first memory SRAM1 and the second memory SRAM2, or for example, the controller CON may determine two storage components or storage regions as the first memory SRAM1 and the second memory SRAM 2 dynamically according to predetermined program instructions before or during the operations of the system.

In an embodiment, the portion in a bold frame in FIG. 1, including the controller CON, the first memory SRAM1, the second memory SRAM2, the first buffer BUF1, and second buffer BUF2, may be embodied on one chip and forms an on-chip system for accessing tensor data. For example, in a case of the AI chip, the portion in the bold frame of FIG. 1 may be embodied on the AI chip and may be used for accessing tensor data efficiently. Accordingly, the memory DDR may be a dynamic random access memory, and may be referred to as an off-chip memory.

The controller CON may perform operations and controls according to predetermined instruction sequences (for example, executable program instruction sequences) or in response to an instruction from the outside.

For simplicity, FIG. 1 shows some aspects associated with the storage, with other components/modules/circuits/units/elements omitted, such as a timing controller for controlling instruction timings, an interruption controller for controlling instruction interruptions, a calculation acceleration core dedicated for performing efficiently predetermined calculations such as a convolutional calculation and a pooling calculation in a convolutional neural network, a crossbar and/or multiplexer for implementing interconnections among components, a coprocessor, an off-chip data transfer manager dedicated for controlling an access to data in the off-chip memory.

In various embodiments, the controller CON in FIG. 1 may correspond to a controller described above which is dedicated for controlling data access, such as a memory access controller, or may also include or implement functions of one or more components/modules/circuits/units/elements omitted above.

For example, in a case of an AI chip, the controller CON may be a processor or controller developed based on a Graphics Processing Unit (GPU), an ARM processor, a Field Programmable Gate Array (FPGA), and so on, and based on executable instruction sequences pre-compiled for a pre-designed artificial neural network, the controller CON may perform operations for example other than the calculations of the artificial neural network and/or provide control instructions and associated parameters to other components or circuits in the AI chip, such as a data access controller and a convolution acceleration core, so that the other components or circuits in the chip may perform corresponding operations in response to the received instructions, such as accessing data in the off-chip memory and/or in-chip memory and enabling the multiplier-accumulator to perform the convolutional calculations.

In another example, in a case of an AI chip, the controller CON may also be an access controller or a data transfer controller on the chip dedicated for controlling access to the off-chip memory and/or the on-chip memory, such as a reduced instruction set calculations (RISC) soft processor core developed based on FPGA, and may control the access to the data in the off-chip memory and/or the on-chip memory independently, or may also control the access to the data in the off-chip memory and/or the on-chip memory, for example cooperating with the main processor or in response to instructions from the main processor.

Both the first buffer BUF1 and the second buffer BUF2 may be caches or static random-access memories whose data access rates may match with the data access rates of the high-speed storage system including the first memory SRAM1 and the second memory SRAM2.

Herein, the wording "match" may mean that the first buffer BUF1, the second buffer BUF2, the first memory SRAM1, and the second memory SRAM2 may have the same or similar data access rates. For example, differences among the data access rates of the first buffer BUF1, the second buffer BUF2, the first memory SRAM1, and the second memory SRAM2, may be below a predetermined threshold, for example, may be within a scope allowed by tolerance and thus may be ignored in practical applications.

In an embodiment, the first buffer BUF1 may include one or more buffer rows, and the second buffer BUF2 may include two or more buffer rows.

In another embodiment, each of the first buffer BUF1 and the second buffer BUF2 may include at least two buffer rows so as to ensure process efficiency during accessing data.

In another embodiment, each of the first buffer BUF1 and the second buffer BUF2 may include two buffer rows, so as to ensure the process efficiency during accessing the data through a hardware structure of low cost.

In another embodiment, each of the first buffer BUF1 and the second buffer BUF2 may be a buffer which is circularly addressed by buffer rows, so as to provide a borderless storage space and to simplify the storage controls.

In another embodiment, the capacity of each buffer row of the first buffer BUF1 may be the same with the total capacity of a plurality of storage units with the same row address in the first memory SRAM1 (i.e., the storage width of the first memory SRAM1), and the capacity of each buffer row of the second buffer BUF2 may be the same with the total capacity of a plurality of storage units with the same row address in the second memory SRAM2 (i.e., the storage width of the second memory SRAM2), so as to simplify the designation and to reduce the complexity of control logic.

Further, the capacity of each buffer row of the first buffer BUF1 may be the same with the capacity of each buffer row of the second buffer BUF2, or the capacity of each buffer row of the first buffer BUF1, the capacity of each buffer row of the second buffer BUF2, the storage width of the first memory SRAM1, and the storage width of second memory SRAM2 may be the same, so as to allowing for adapting such a case where the first memory SRAM1 and the second memory SRAM2 may be determined dynamically.

For simplicity, the embodiments or examples of the present disclosure will be described in an example configurations, where the controller CON performs predetermined instruction sequences and controls to store into the first memory SRAM1 at least a part of data from the memory DDR or at least a part of data from the other calculation components in the system (for example, the convolution acceleration core) and to be output to the memory DDR, and then controls the data flow in an order: the first memory SRAM1→the first buffer BUF1→the second buffer BUF2→the second memory SRAM2, so that a part of data items in the first memory SRAM1 are stored into the second memory SRAM2 in a desired manner, and where each of the first buffer BUF1 and the second buffer BUF2 may include two buffer rows addressed circularly by the buffer rows.

As described above, the first memory SRAM1 and the second memory SRAM2 also may be determined dynamically. For example, the controller CON may dynamically determine the data flow before or during the operations of the system according to predetermined program instructions, so that during a process of actual operations, the flow directions of data may actually include the first memory SRAM1→the first buffer BUF1→the second buffer BUF2→the second memory SRAM2 and/or the second memory SRAM2→the first buffer BUF1→the second buffer BUF2→the first memory SRAM1.

Figure 3:
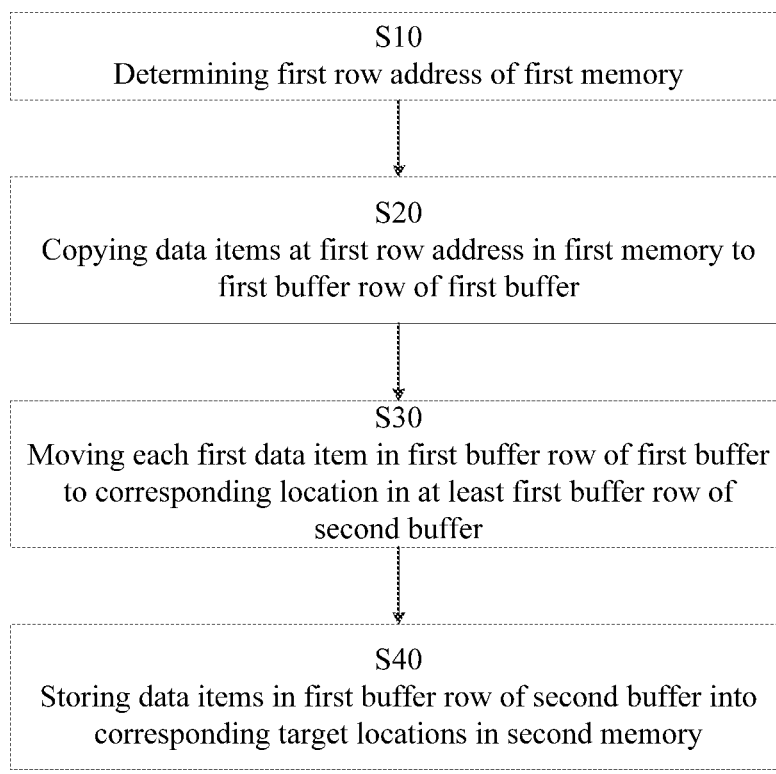
FIG. 3 shows an example method according to an embodiment.

FIG. 3 shows an example method for accessing tensor data in an embodiment. For example, the example method may be performed by the controller CON in the example system of FIG. 1.

As shown in FIG. 3, the example method in the embodiment may include steps S10, S20, S30, and S40.

At the step S10, the first row address of the first memory SRAM1 is determined, where at least one first data item to be accessed in the logical structure of the tensor data is stored at the first row address of the first memory SRAM1.

At the step S20, data items at the first row address in the first memory SRAM1 may be copied into the first buffer row of the first buffer BUF1. In various examples, the data items copied into the first buffer row of the first buffer BUF1 may include the at least one first data item at the step S10, and may also include other data items not expected to be accessed.

At the step S30, each first data item in the first buffer row of the first buffer BUF1 may be moved to a corresponding location at least in the first buffer row of the second buffer BUF2. For each first data item, the corresponding location at least in the first buffer row of the second buffer BUF2 may depend on a target location in second memory SRAM2 allocated to the first data item.

Depending on the corresponding locations in the second buffer BUF2 of the first data items, the first data items moved from the first buffer BUF1 into the second buffer BUF2 may occupy the first buffer row of the second buffer BUF2, and may also occupy both the first buffer row of the second buffer BUF2 and other one or more buffer rows.

When the first data items moved from the first buffer BUF1 into the second buffer BUF2 occupy both the first buffer row and the other one or more buffer rows of the second buffer BUF2, in the first memory SRAM1, each first data item in the first buffer row of the second buffer BUF2 is located before each first data item in each other buffer row of the second buffer.

At the step S40, data items in the first buffer row of the second buffer BUF2 are stored into corresponding target locations in the second memory SRAM2.

In various situations, the data items to be stored into the corresponding target locations in the second memory SRAM2 at this step include at least the first data items in the first buffer row of the second buffer BUF2, and may also include the data items which are remained in the first buffer row of the second buffer BUF2 after previous process and which are expected to be accessed but are still not output to the target locations in the second memory SRAM2 (as described hereafter, the above steps S10 to S40 may be repeated).

Figure 4:
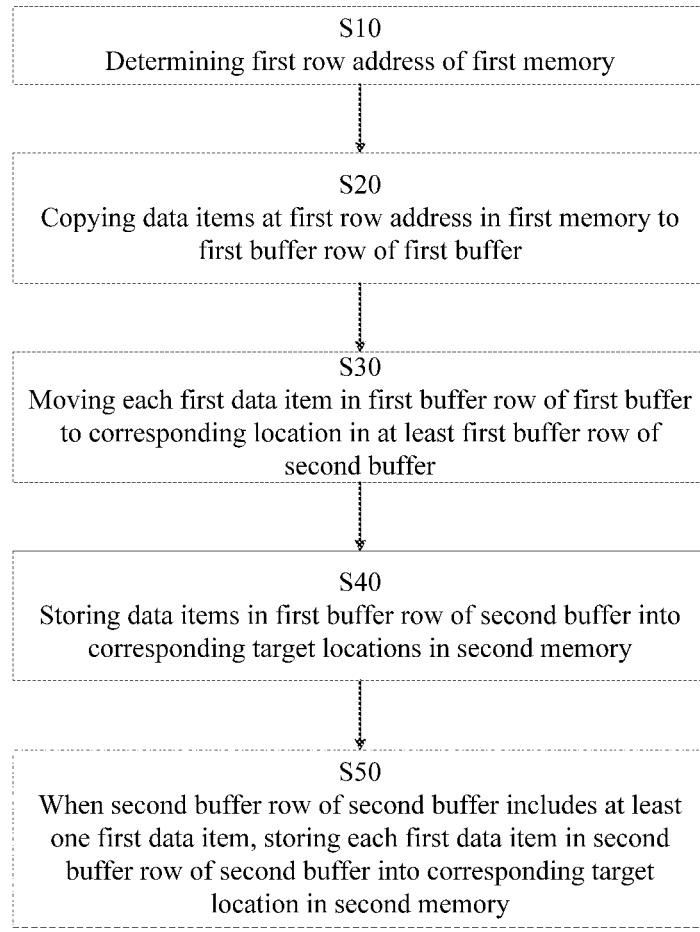
FIG. 4 shows an example method according to an embodiment.

When the above first row address is the last one row address in the first memory SRAM1 to be processed, as shown in FIG. 4, the example method in an embodiment may further include a step S50.

At the step S50, when the second buffer row of the second buffer BUF2 includes at least one first data item, each first data item in the second buffer row of the second buffer BUF2 may be stored into a corresponding target location in the second memory SRAM2. In the first memory SRAM1, each first data item in the second buffer row of the second buffer BUF2 is located after each first data item in the first buffer row of the second buffer BUF2.

Figure 5:
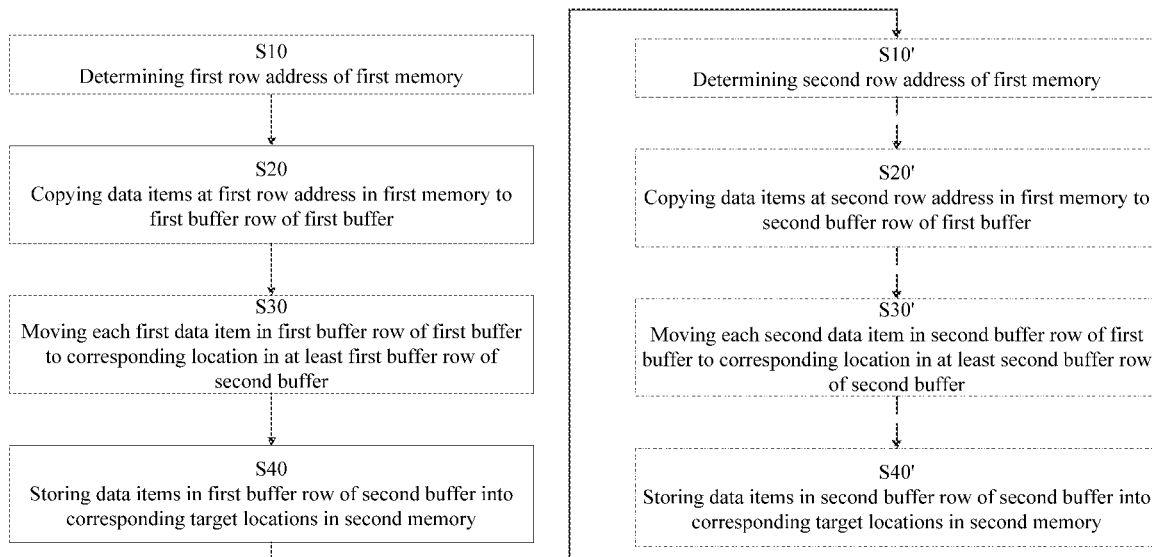
FIG. 5 shows an example method according to an embodiment.

When the first memory SRAM1 includes further row addresses to be processed, for example when there is a second row address to be continually processed after the above first row address, as shown in FIG. 5, the example method in an embodiment may further include steps S10', S20', S30', and S40'.

At the step S10', the second row address of the first memory SRAM1 may be determined, where at least one second data item to be accessed in the logical structure of the tensor data is stored at the second row address in the first memory SRAM1.

At the step S20', data items at the second row address in the first memory SRAM1 may be copied into the second buffer row of the first buffer BUF1.

As described above, the first buffer BUF1 may also include one buffer row, where, at the step S20', the data items at the second row address in the first memory SRAM1 may be copied into the one buffer row of the first buffer BUF1. When the steps S40 and S10' are performed in order as shown in FIG. 5, the first buffer BUF1 including one buffer row may also be used.

However, when to adopt a pipelined way (to be described in detail hereafter), the data items copied into the first buffer BUF1 previously at the step S20 need to be moved into the second buffer BUF2 at the step S30, before copying the data items at second row address in the first memory SRAM1 into the one buffer row in the first buffer BUF1.

Thus, in a case of utilizing the first buffer BUF1 including one buffer row, when adopting the pipelined way, the steps S20' and S40 may be controlled to be performed in parallel.

If the first buffer BUF1 includes two buffer rows which may be used interchangeably or may be addressable circularly by buffer rows, then when adopting a pipeline way, the step S20' (possibly including the step S10') may be performed in parallel with any of the steps S10, S20, S30 and S40. Such a control may be more flexible, and a more efficient pipeline control may be implemented. Moreover, only one buffer row is added, which is acceptable in view of hardware costs. Further, where the cost allows, the first buffer BUF1 may include more buffer rows, and may be addressed circularly by buffer rows, so as to obtain a borderless storage space.

At the step S30', each second data item in the second buffer row of the first buffer BUF1 may be moved to the corresponding location in at least the second buffer row of the second buffer BUF2. The corresponding location in at least the second buffer row of the second buffer BUF2 for each second data item may depend on a target location in the second memory SRAM2 allocated to this second data item.

At the step S30', due to the above step S30 and S40, one or more first data items which are not yet output to the target locations in the second memory SRAM2 may be included in the second buffer row of the second buffer BUF2. Thus, at the step S30', each second data item is moved into at least the second buffer row of the second buffer BUF2. Thus, all data to be accessed may be finally output into the second memory SRAM2 in a simple manner.

Similar to the above step S30, depending on corresponding locations in the second buffer BUF2 of the second data items, the second data items moved from the first buffer BUF1 into the second buffer BUF2 may occupy the second buffer row of second buffer BUF2, may also occupy both the second buffer row of the second buffer BUF2 and other one or more other buffer rows of the second buffer BUF2. If the second data items moved from the first buffer BUF1 into second buffer BUF2 occupy both the second buffer row and one or more other buffer rows of the second buffer BUF2, then in the first memory SRAM1, each second data item in the second buffer row of the second buffer BUF2 is located before each second data item in each of the one or more other buffer rows of the second buffer BUF2.

Thus, as described above, the second buffer BUF2 may include two buffer rows which may be addressed circularly by buffer rows. Where the cost allows, the second buffer BUF2 may include more buffer rows which are addressable circularly by buffer rows. Further, the second buffer BUF2 may support reading and writing data within one read-write cycle. For example, the second buffer BUF2 may support outputting data from one buffer row at a first time point of a read-write cycle (for example, a rising edge of a read-write clock) and inputting data into another buffer row at a second time point of the read-write cycle (a falling edge of the read-write clock). Thus, the performance of a chip may be further improved.

At the step S40', the data items in the second buffer row of the second buffer BUF2 may be stored into corresponding target locations in the second memory SRAM2.

Similar to the above step S40, in various examples, the data items to be stored into the corresponding target locations in the second memory SRAM2 at the step S40' include at least the second data items in the second buffer row of the second buffer BUF2, and may also include the first data items to be accessed which are remained in the second buffer row of the second buffer BUF2 after the steps S30 and S40 but are still not output into the target locations in second memory SRAM2.

Figure 6:
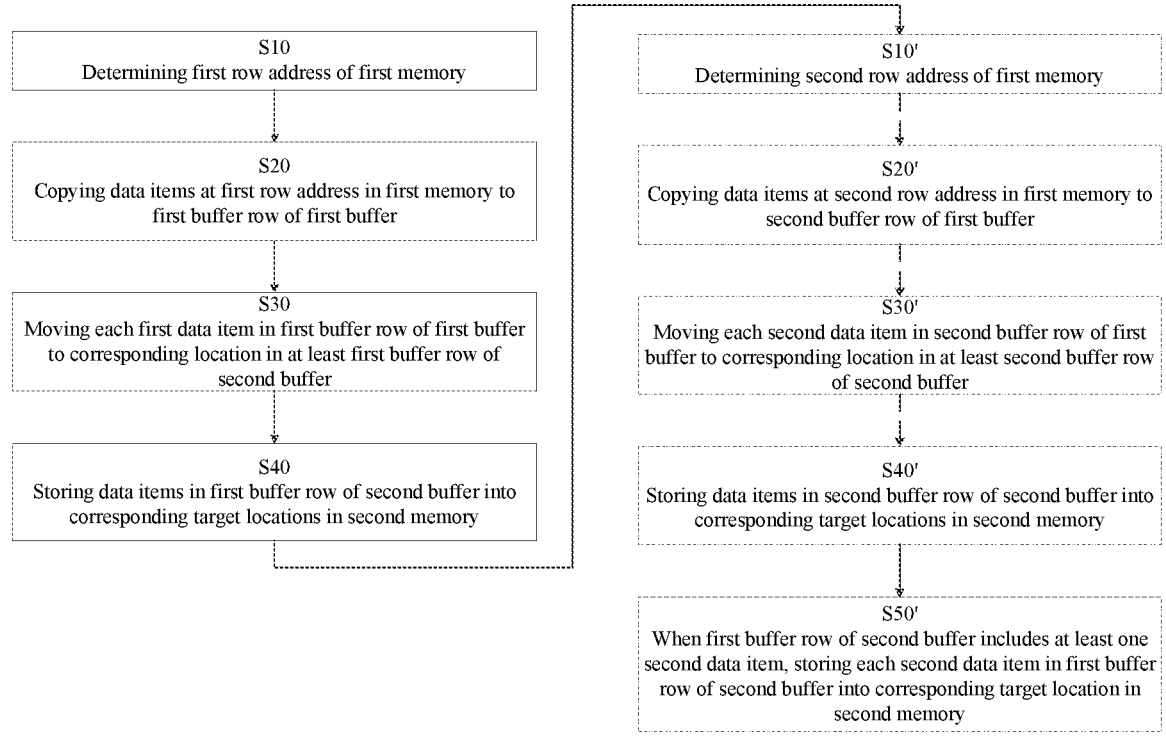
FIG. 6 shows an example method according to an embodiment.

If the above second row address is the last one row address to be processed in the first memory SRAM1, as shown in FIG. 6, the example method in an embodiment may further include a step S50'.

At the step S50', if the first buffer row of the second buffer BUF2 include at least one second data item, each second data item in the first buffer row of the second buffer BUF2 may be stored into the corresponding target location in the second memory SRAM2. In the first memory SRAM1, each first data item in the first buffer row of the second buffer BUF2 is located behind each first data item in the second buffer row of the second buffer BUF2.

Figure 7:
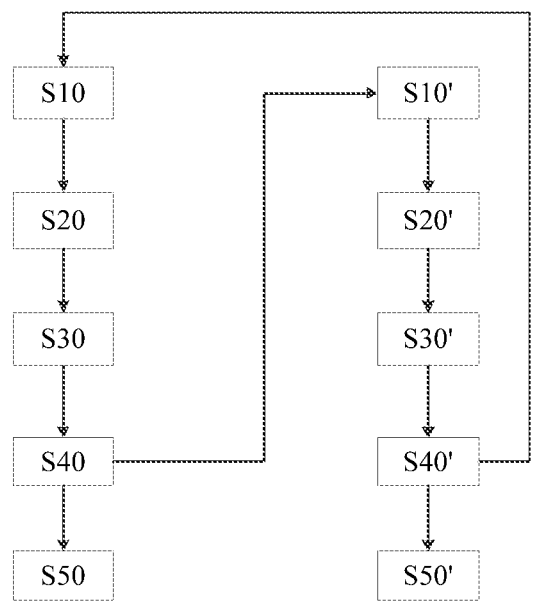
FIG. 7 shows an example method according to an embodiment.

When additional row addresses to be processed are included in the first memory SRAM1, for example when there is a third row address to be processed after the above second row address, as shown in FIG. 7, after the step S40', the steps S10 to S40 may be repeated for the third row address by replacing the above first row address with the third row address. If the third row address is the last row address to be processed, the step S50 may be performed after the step S40. Otherwise, if there is still a fourth row address to be processed after the above third row address, after the step S40, the steps S10' to S40' may be repeated for the fourth row address by replacing the above second row address with the fourth row address. If the fourth row address is the last row address to be processed, the step S50' may be performed after the step S40'. Similar processes may be repeated until all of the row addresses to be processed in the first memory SRAM1 are processed.

Figure 8:
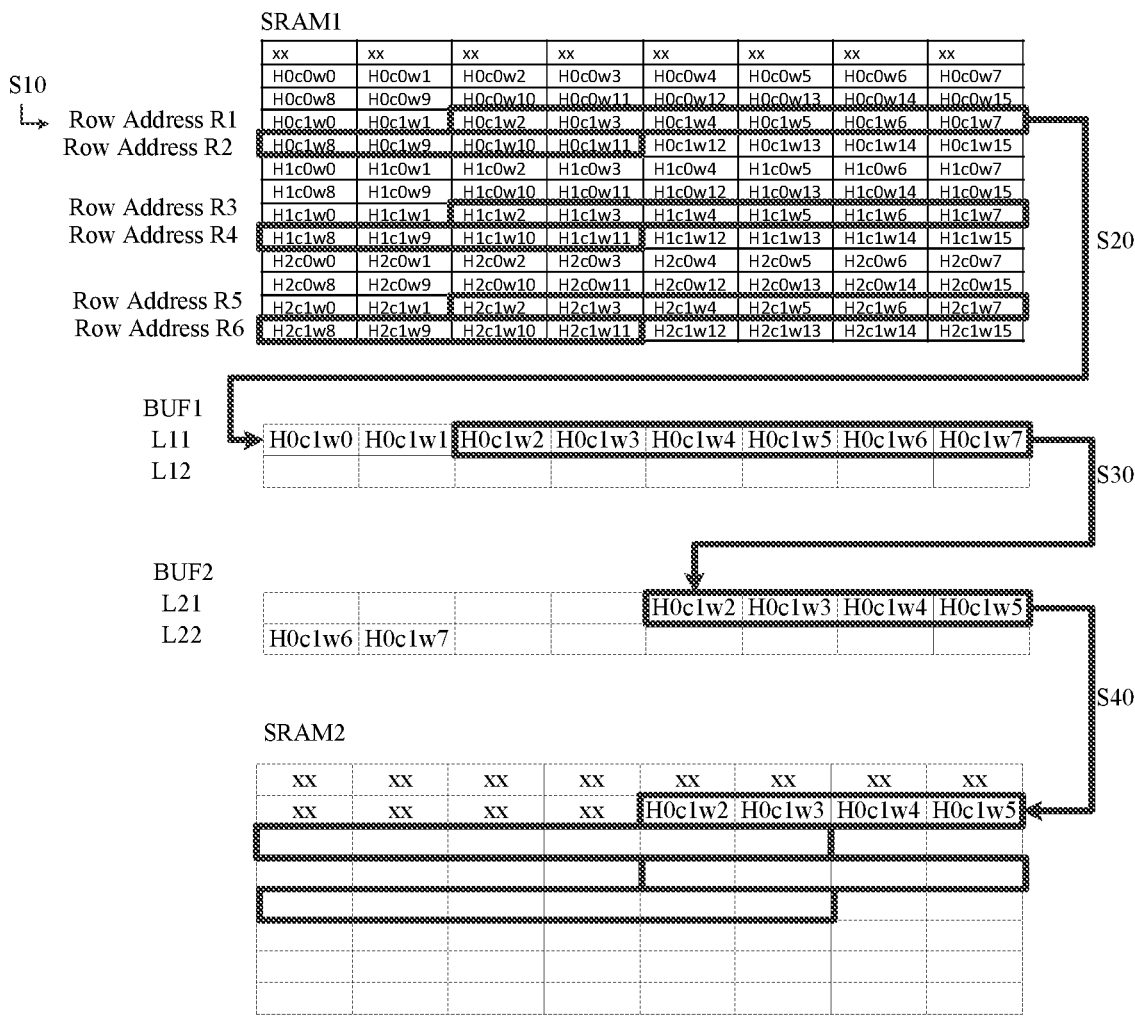
FIG. 8 shows an example method according to an embodiment.

For example, as shown in FIG. 8, before or when performing the step S10 in example method of FIG. 7, a part of data items of a tensor data is stored sequentially in the first memory SRAM1. For example, H1c1w9 represents a data value of a Voxel in the logical structure (which may be a data cube, and in this example, rows, columns, and channels of which are counted from 0) of the tensor data, which is located at the first row (H1), the first channel (c1) and the ninth column (w9).

In the example of FIG. 8, only the data items from the 0th row to the 1st row (H0~H1) and from the 2nd column to the 11th column (w2~w11) in the 1st channel (c1) in the logic structure of the tensor data, i.e. the data items in the bold frames in SRAM1 of FIG. 8, are expected to be accessed. Moreover, this part of data items is expected to be obtained and processed efficiently in subsequent operations. For example, the part of data items is expected to be obtained accurately by the convolutional calculation core for convolutional calculation while satisfying a requirement of data alignment of hardware. For example, the part of data items is expected to be filled or output to predetermined location in a predetermined storage region as it is, so as to further implement a splice or combination of feature data directly and simply. Thus, this part of data items is expected to be stored in the on-chip memory in an expected manner, for example in a manner as shown by the bold frame in SRAM2 of FIG. 8.

As shown in FIG. 8, at the step S10, the controller CON may determine the first row address R1 of the first memory SRAM1.

The data items at the first row address R1 include H0c1w0, H0c1w1, H0c1w2, H0c1w3, H0c1w4, H0c1w5, H0c1w6, and H0c1w7, wherein H0c1w2, H0c1w3, H0c1w4, H0c1w5, H0c1w6, and H0c1w7 are the data item to be accessed in the logical structure of the tensor data to be processed, that is, the first data items.

In an embodiment, the first row address of the first memory SRAM1 may be determined according to a data scope to be accessed in the logical structure of the tensor data to be processed. For example, such scope may be provided by instruction parameters.

For example, in the example of FIG. 8, the data items of the tensor data are stored continuously in the first memory SRAM1. Thus, if the storage width of the first memory SRAM1 is known (in the example of FIG. 8, one row of the first memory SRAM1 may store eight data items), the controller CON may determine a location in the first memory SRAM1 for each data item, so that one or more row addresses may be determined according to the data scope to be accessed in the logical structure of the tensor data to be processed. Then, at each step S10, the controller CON may determine a first row address of the first memory SRAM1 through a row address register and/or a row address counter.

In another example, the controller CON may record a reference address in the first memory SRAM1, and then may determine a row address at the step S10 according to the data scope to be accessed in the logical structure of the tensor data to be processed, so that in the first memory SRAM1, a storage region from the reference address and before the row address does not include data items in the data scope to be accessed. Then, the reference address may be updated to be a next row address after the determined row address.

As shown in FIG. 8, at the step S20, the controller CON may perform instructions to copy all data items at the row address R1 of the first memory SRAM1 into the first buffer row L11 of the first buffer BUF1, wherein H0c1w0 and H0c1w1 are not the data items to be accessed.

In an embodiment, the capacity of each buffer row of the first buffer BUF1 may be the same with the total capacity of a plurality of storage units in the first memory SRAM1 with the same row address, so that data may be read from the first memory SRAM1 into the first buffer BUF1 simply and efficiently at the step S10.

As shown in FIG. 8, at the step S30, the controller CON may perform instructions to determine the first available storage region in the second memory SRAM2 (i.e., the region after "XX" in the second storage row in SRAM2 of FIG. 4) as target locations in the second memory SRAM2 for the first data items H0c1w2, H0c1w3, H0c1w4, H0c1w5, H0c1w6 and H0c1w7.

In another example, the controller CON may also perform instructions to the determine target locations in the second memory SRAM2 for the first data items H0c1w2, H0c1w3, H0c1w4, H0c1w5, H0c1w6 and H0c1w7, according to padding locations in the target tensor which may be indicated by instruction parameters or be determined according to the expected location of a local tensor in the target tensor.

As shown in FIG. 8, at the step S30, the controller CON may perform instructions to move the first data items H0c1w2, H0c1w3, H0c1w4, H0c1w5, H0c1w6 and H0c1w7 in the first buffer row L11 of the first buffer BUF1 into at least the first buffer row L21 of second buffer BUF2, wherein the first data items H0c1w2, H0c1w3, H0c1w4, and H0c1w5 occupy the first buffer row L21 of the second buffer BUF2, and H0c1w6 and H0c1w7 occupy the second buffer row L22 of the second buffer BUF2. As shown in FIG. 8, corresponding locations of the first data items in the second buffer BUF2 may depend on the target locations allocated in the second memory SRAM2 for H0c1w2, H0c1w3, H0c1w4, H0c1w5, H0c1w6 and H0c1w7.

Herein, moving the data items in the first buffer row L11 of the first buffer BUF1 into the second buffer BUF2 may mean copying the data items in the first buffer row L11 of the first buffer BUF1 into the second buffer BUF2, and may also mean clearing all contents in the first buffer row L11 of the first buffer BUF1 after copying the data items in the first buffer row L11 of the first buffer BUF1 into the second buffer BUF2.

As shown in FIG. 8, at the step S40, the controller CON may perform instructions to store or fill the data items H0c1w2, H0c1w3, H0c1w4, and H0c1w5 in the first buffer row L21 of the second buffer BUF2 into the corresponding target locations in the second memory SRAM2.

At the above steps S10 to S40, the first buffer BUF1 may be used for buffering a complete row of data items of the first memory SRAM1 so as to satisfying data alignment of hardware when accessing data and to access data efficiently, and the second buffer BUF2 may be used for buffering the data items to be accessed in an expected arrangement so that data format transformation may be enabled directly by hardware. Then, the data items in the second buffer BUF2 may directly output into the second memory SRAM2 with data alignment. Thus, the data items to be accessed may be obtained from the tensor data by hardware directly according to the expected data arrangement.

In the example of FIG. 8, another row address or a second row address R2 in the first memory SRAM1 may be processed. Referring to FIG. 7, the steps S10' to S40 may be repeated for the second row address R2.

Figure 9:
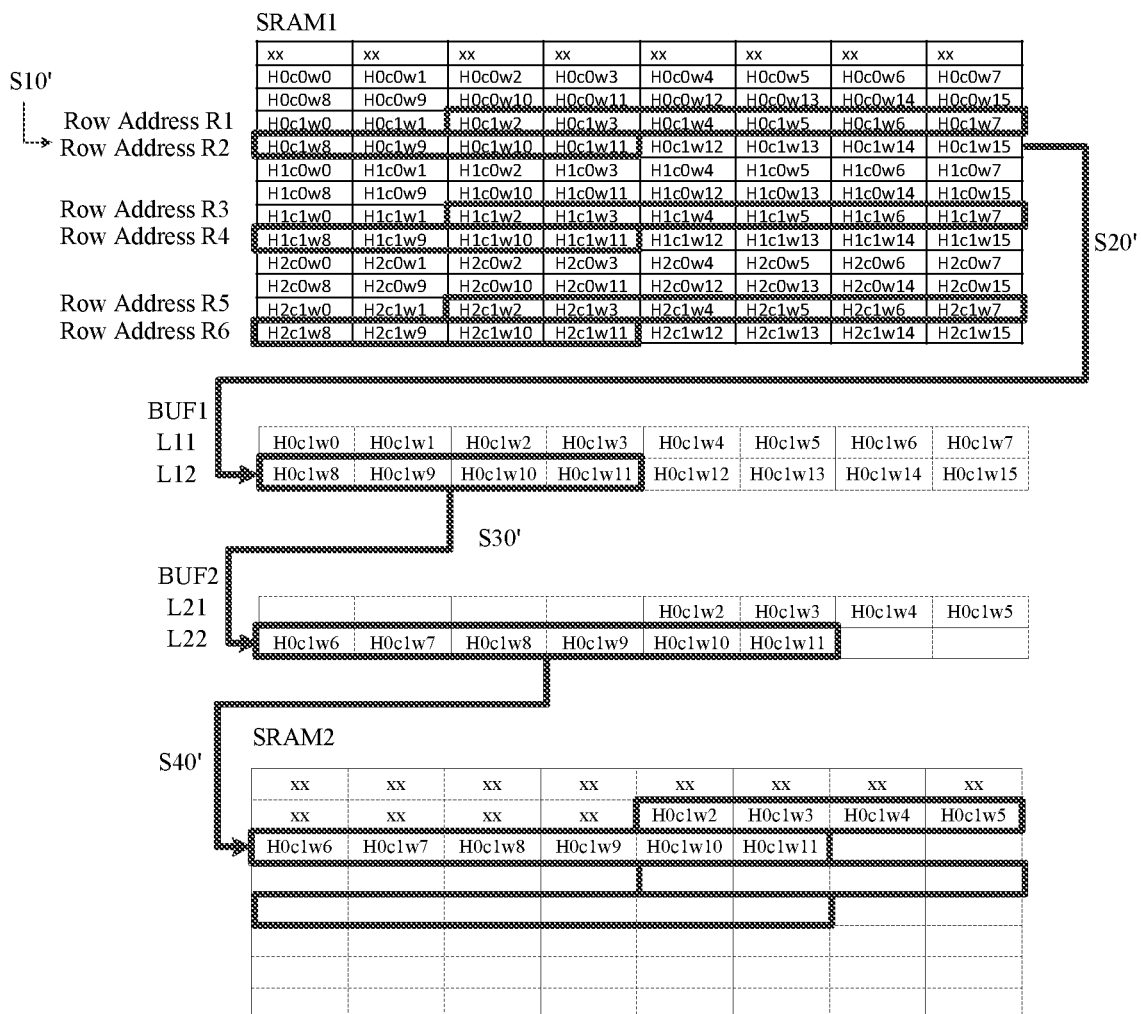
FIG. 9 shows an example method according to an embodiment.

As shown in FIG. 9, the second row address R2 of the first memory SRAM1 may be determined at the step S10'. The data items at the second row address R2 include H0c1w8, H0c1w9, H0c1w10, H0c1w11, H0c1w12, H0c1w13, H0c1w14, and H0c1w15, wherein H0c1w8, H0c1w9, H0c1w10, and H0c1w11 belongs to the data to be accessed in the logical structure of the tensor data to be processed.

As shown in FIG. 9, at the step S20', the data items at the second row address R2 in the first memory SRAM1 may be copied into the second buffer row L12 of the first buffer BUF1. For example, the controller CON may perform instructions to copy all data items at the row address R2 of the first memory SRAM1 into the second buffer row L12 of the first buffer BUF1 (in this embodiment, the data items may also be copied into the first buffer row L11 of the first buffer BUF1, and the first buffer BUF1 may include only one buffer row), wherein H0c1w12, H0c1w13, H0c1w14, and H0c1w15 are not the data items to be accessed.

As shown in FIG. 9, at the step S30', each second data item belonging to the data part to be accessed in the second buffer row L12 of the first buffer BUF1 may be moved into the corresponding location in at least the second buffer row L22 of the second buffer BUF2. For each second data item, the corresponding location in at least the second buffer row L22 of second buffer BUF2 depends on a target location in the second memory SRAM2 allocated to this second data item.

For example, as shown in FIG. 9, H0c1w8, H0c1w9, H0c1w10, H0c1w11 and the data items H0c1w6 and H0c1w7 currently buffered in the second buffer row L22 of the second buffer BUF2 are consequent data items. Thus, the controller CON may perform the instructions to move H0c1w8, H0c1w9, H0c1w10, and H0c1w11 in the second buffer row L12 of the first buffer BUF1 into the second buffer row L22 of the second buffer BUF2, behind H0c1w6 and H0c1w7.

In the example of FIG. 9, the second data items belonging to the data part to be accessed in the second buffer row L12 of the first buffer BUF1 occupy only the second buffer row L22 of the second buffer BUF2.

As shown in FIG. 9, at the step S40, the controller CON may perform the instructions to store or fill the data items in the second buffer row L22 of the second buffer BUF2 into the corresponding target locations of the second memory SRAM2.

Figure 10:
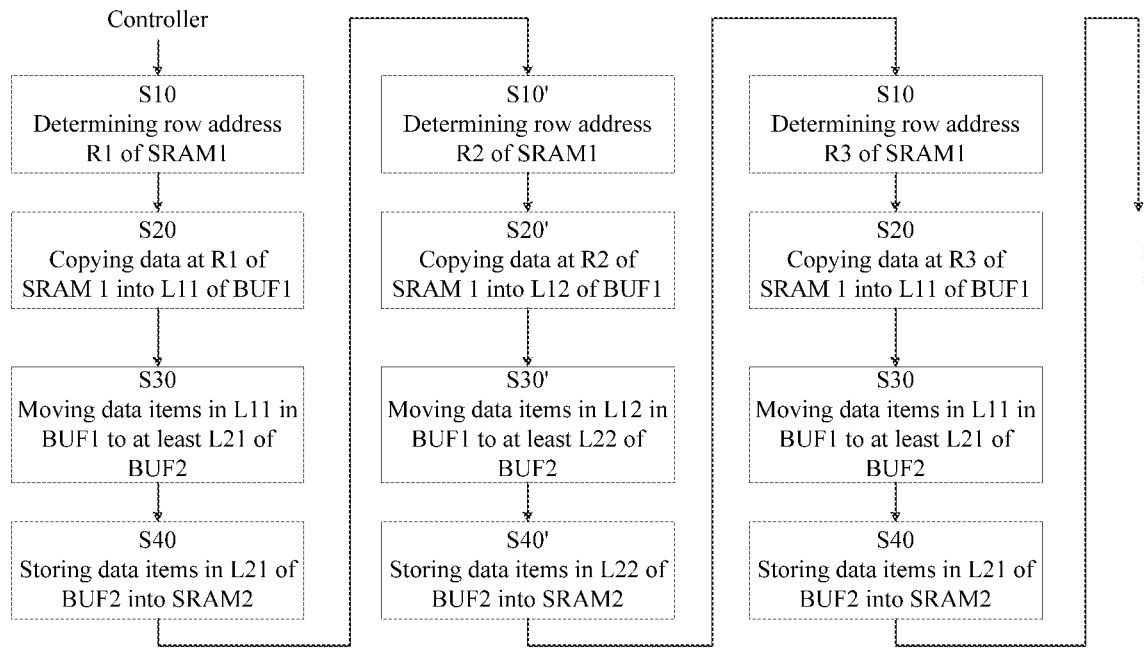
FIG. 10 shows an example method according to an embodiment.

Further, for another row addresses such as R3, R4, R5, and R6, as shown in FIG. 10, the steps S10 to S40 and/or S10' to S40' may be repeated continually according to the controlling flow as shown in FIG. 7, so that the data items to be accessed may flow from the first memory SRAM1 into the second memory SRAM2 continually in a flow direction of the first memory SRAM1→the first buffer BUF1→the second buffer BUF2→the second memory SRAM2, and may be stored in the second memory SRAM2 in a desired arrangement.

In the example method in the embodiments, one row of data in the first memory SRAM1 are processed within each cycle so that the data items to be accessed in the first memory SRAM1 may be obtained simply and efficiently while satisfying a requirement of data alignment of hardware. Then, the data items to be accessed may be stored into the second memory SRAM2 in a desired arrangement, so that during subsequent processes, for example, the convolutional calculation core for performing convolutional calculations may obtain expected data items efficiently and precisely, and at least during processing the data items already loaded into the first memory SRAM1, data exchange/transfer between the external memory DDR and the internal high speed storage system (including the first memory SRAM1 and second memory SRAM2) may be ignored, so that the performance of the AI chip may be improved and the power consumption of the AI chip may be reduced.

Further, when to merge or splice a plurality of partial tensor data, target locations of data items in the second memory SRAM2 may be determined according to the structure of the target tensor to be composed, then the merging or splicing the feature data may be implemented directly by the example method in the embodiments. Thus, at least the operations for merging or splicing tensor data by the controller CON may be omitted or simplified, and the working load of the controller CON may be reduced, so that the controller CON may work for other more controls and processes. Thus, the performance of the AI chip may be improved.

Further, in the above examples, each of the first buffer BUF1 and the second buffer BUF2 may include two buffer rows which may be addressed circularly by rows, which enable the first buffer BUF1 and/or the second buffer BUF2 to provide a storage space without address boundary. In another example, if the cost allows, each of the first buffer BUF1 and second buffer BUF2 may also include more buffer rows which may be addressed circularly by rows, so as to implement a more flexible access control.

In another example, if the controller CON performs instructions according to the example processes as shown in FIG. 7 to FIG. 10, the first buffer BUF1 may also include only one buffer row so as to save the cost.

Figure 11:
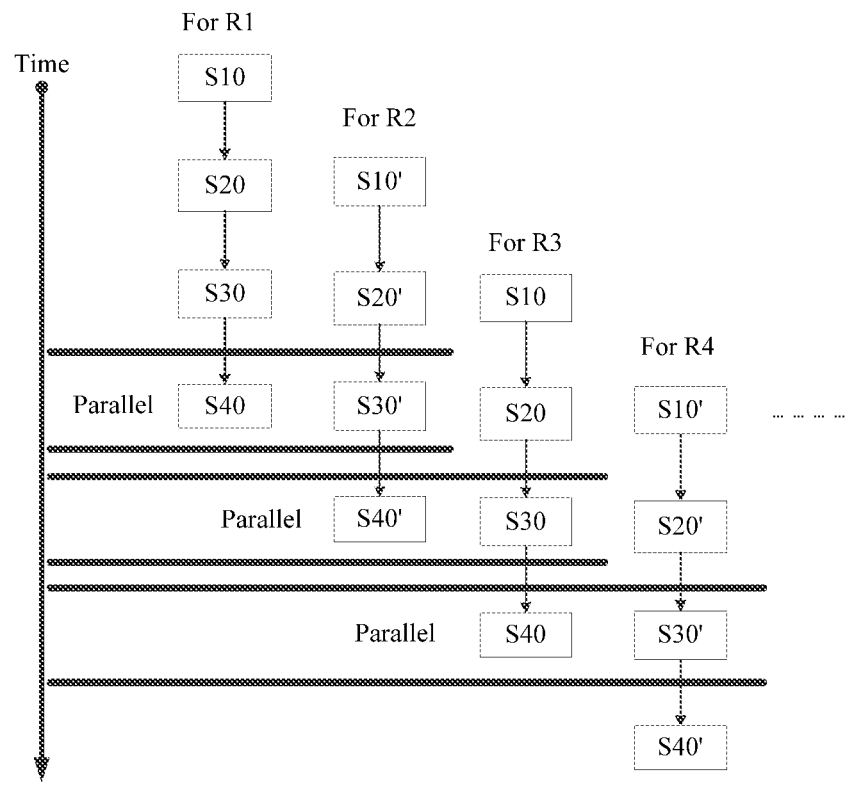
FIG. 11 shows an example method according to an embodiment.

In another embodiment, the example method may also be performed in a pipeline way so as to achieve higher process efficiency. For example, the steps of the example method in the embodiments may be performed in a pipeline manner as shown in FIG. 11 where the steps S50 and S50' are not shown in FIG. 11 for simplicity. For example, the step S30' for the row address R2 may be performed in parallel with the step S40 for the row address R1, the step S30 for the row address R3 may be performed in parallel with the step S40' for the row address R2, and so on.

The row addresses to be processed in the first memory SRAM1 may be numbered, for example, from 1 according to an order of natural numbers.

In an example, the steps S10 to S40 may be performed for the row addresses with odd numbers, such as the above first and third row addresses. If the last row address to be processed is odd-numbered, the step S50 may be involved at the end of the method. The steps S10' to S40' may be performed for the row addresses with even numbers, such as the above second and fourth row addresses. If last row address to be processed is even-numbered, the step S50' may be involved at the end of the method.

Accordingly, in a pipelined control flow, the step S30' for the even-numbered row address R2$i$ may be performed in the parallel with the step S40 for the odd-numbered row address R2$i$−1, and the step S30 for the odd-numbered row address R2$i$+1 may be further performed in parallel with the step S40' for the even-numbered row address R2$i$ if necessary, wherein i is any natural number.

It is appreciated that the above numbering is an example. For example, the numbering may also be start from 0.

Accordingly, an example of the example method in an embodiment may include performing the steps S10 to S40 for odd-numbered row addresses such as the above first and third row addresses where the step S50 may be also involved at the end of the example method if the last row address to be processed is odd-numbered, and performing the steps S10' to S40' for the even-numbered row addresses such as the above second and fourth row addresses where the step S50' may b also involved at the end of the example method if the last row address to be processed is oven-numbered.

Accordingly, in the pipelined control flow, the step S30' for the row address R2$i$−1 may be performed in parallel with the step S40 for the odd-numbered row address R2$i$, and the step S30 for the odd-numbered row address R2$i$ may be further performed in parallel with the step S40' for the oven-numbered row address R2$i$−1 if necessary, wherein i is any natural number.

Figure 12:
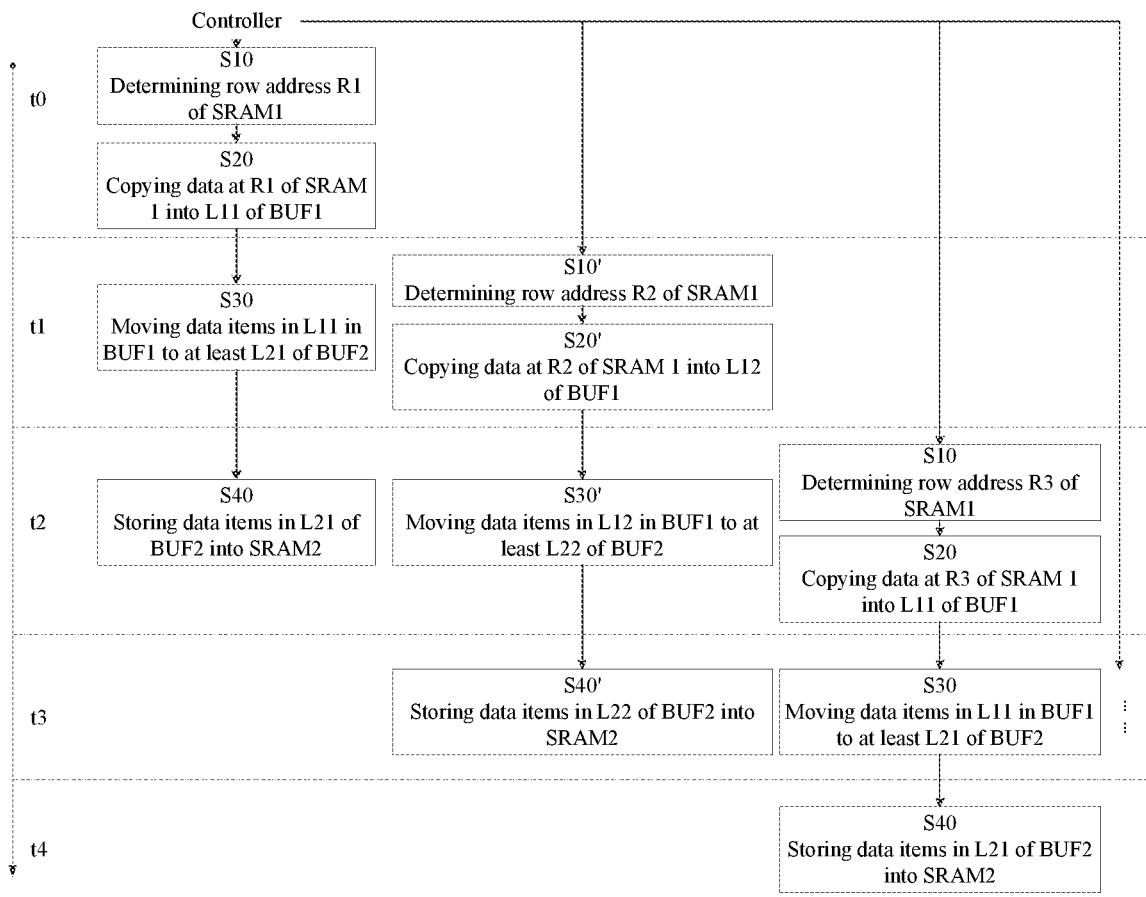
FIG. 12 shows an example method according to an embodiment.
Figure 13:
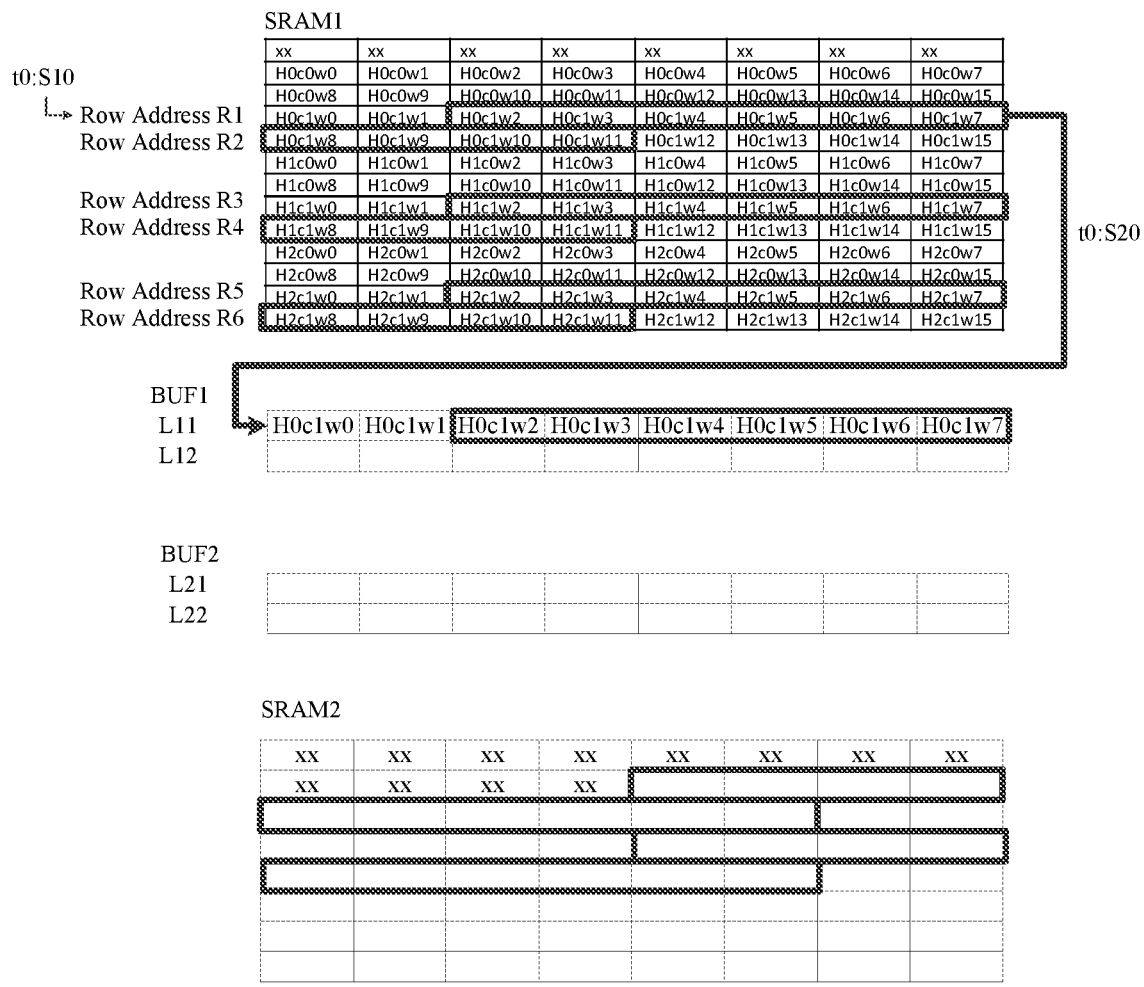
FIG. 13 shows an example method according to an embodiment.

For example, still for the data in the first memory SRAM1 in the example of FIG. 8, FIG. 12 shows an example of the pipelined control flow of FIG. 11, wherein the controller CON may perform instructions in a pipeline in an order of the time periods t0, t1, t2, . . . , so as to implement the example method in the embodiments. As shown in FIG. 11 and FIG. 13, at the time period t1, the steps S10 and S20 may be performed to read or copy all data at the row address R1 in the first memory SRAM1 to the first buffer row L11 of the first buffer BUF1.

Figure 14:
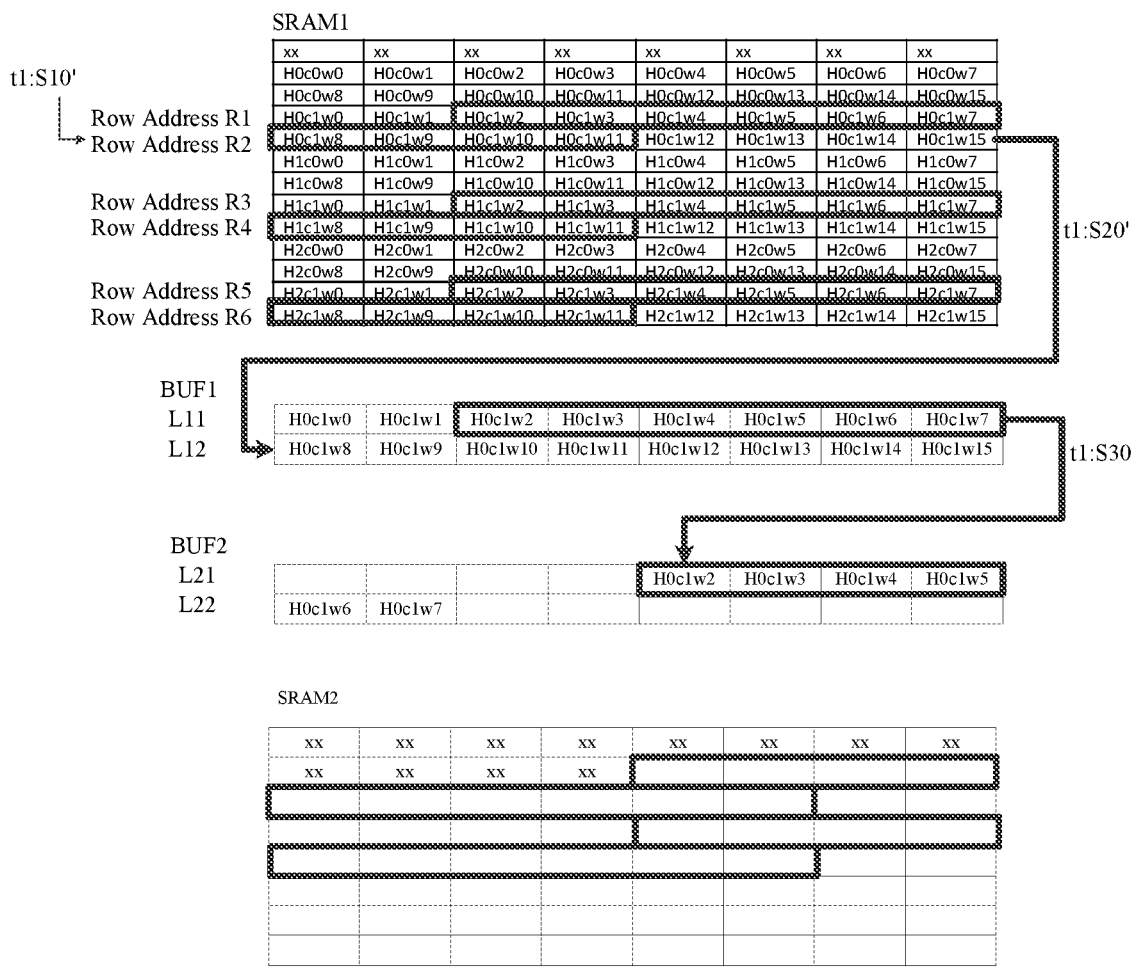
FIG. 14 shows an example method according to an embodiment.

Then, as shown in FIG. 11 and FIG. 14, the step S30 may be performed at the time period t1 just following the time period t0, so as to move each first data item (H0c1w2 to H0c1w7) belonging to the data to be accessed in the first buffer row L11 of the first buffer BUF1 to the corresponding location in at least the first buffer row L21 of the second buffer BUF2. In parallel, the steps S10' and S20' may be performed to read or copy all data items at the row address R2 in the first memory SRAM1 into the second buffer row L12 of the first buffer BUF1.

In this embodiment, each of the first buffer BUF1 and the second buffer BUF2 may include at least two buffer rows which are addressed circularly by rows. For example, to save the costs, each of the first buffer BUF1 and the second buffer BUF2 may include only two buffer rows which are addressed circularly by rows. Further, in an embodiment, the first buffer BUF1 and/or the second buffer BUF2 may be a buffer supporting reading old data and writing new data in one read-write cycle.

As shown in FIG. 14, at the time period t1, if the second buffer row L22 of the second buffer BUF2 include at least one first data item (H0c1w6 and H0c1w7), the storage locations in the first memory SRAM 1 for the first data items (H0c1w2 to H0c1w5) in the first buffer row L21 of the second buffer BUF2 are before the storage locations in the first memory SRAM 1 for the first data items (H0c1w6 and H0c1w7) in the second buffer row L22 of the second buffer BUF2.

Figure 15:
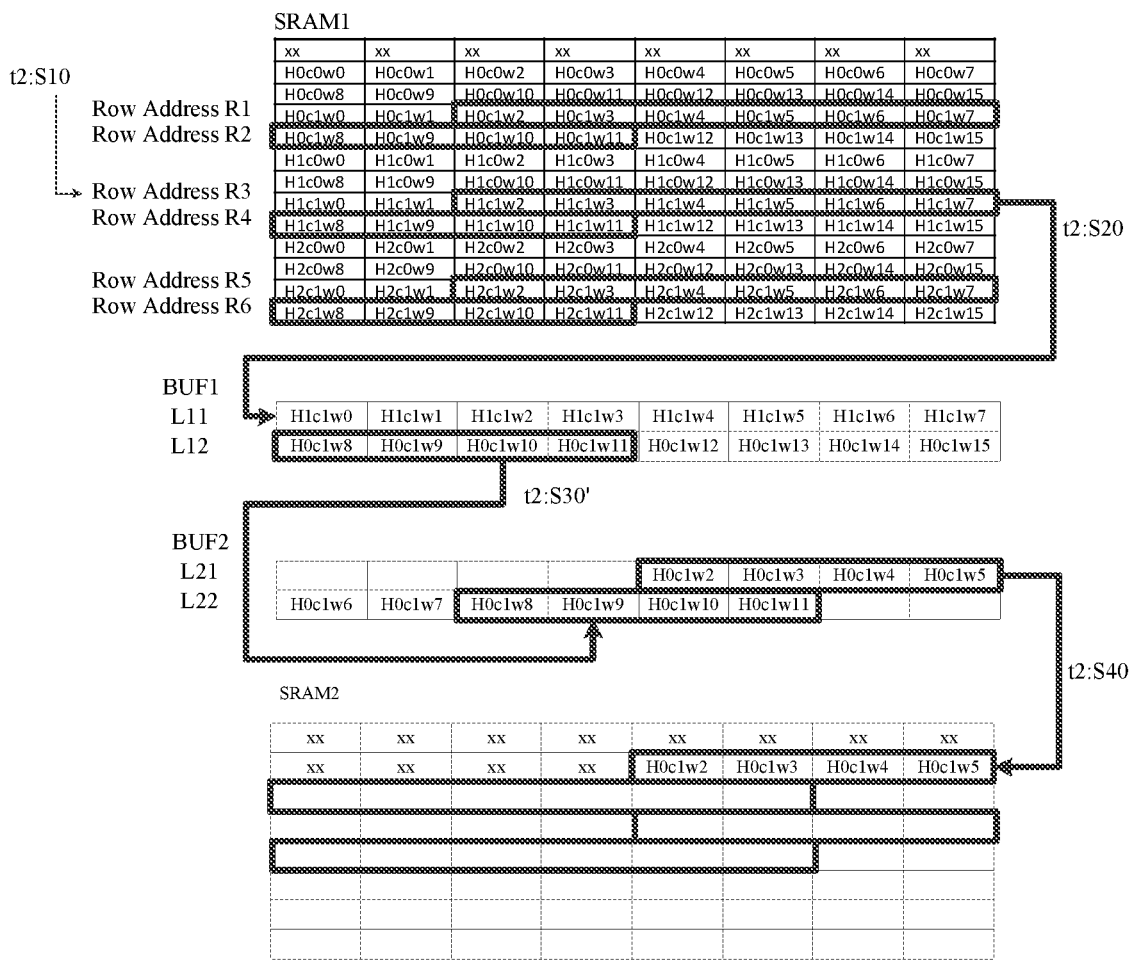
FIG. 15 shows an example method according to an embodiment.

As shown in FIG. 11 and FIG. 15, the step S40 may be performed during the time period t2 just following the time period t1, so as to store the data items (H0c1w2 to H0c1w5) in the first buffer row L21 of the second buffer BUF2 into the corresponding target locations in the second memory SRAM2. In parallel, the step S30' may be performed to move the second data items (H0c1w8 to H0c1w11), which are in the second buffer row L12 of the first buffer BUF1 and belong to the data to be accessed, to the second buffer row L22 of the second buffer BUF2, where the corresponding location of each second data item (H0c1w8-H0c1w11) in at least the second buffer row L22 of the second buffer BUF2 depends on the target location in the second memory SRAM2 allocated to this second data item. In parallel, the steps S10 and S20 may be further performed to read or copy all data items at the row address R3 in the first memory SRAM1 to the first buffer row L11 of the first buffer BUF1.

In this example, the second data items (H0c1w8 to H0c1w11) moved to the second buffer BUF2 during the time period t2 only occupy the second buffer row L22 of the second buffer BUF2.

Figure 16:
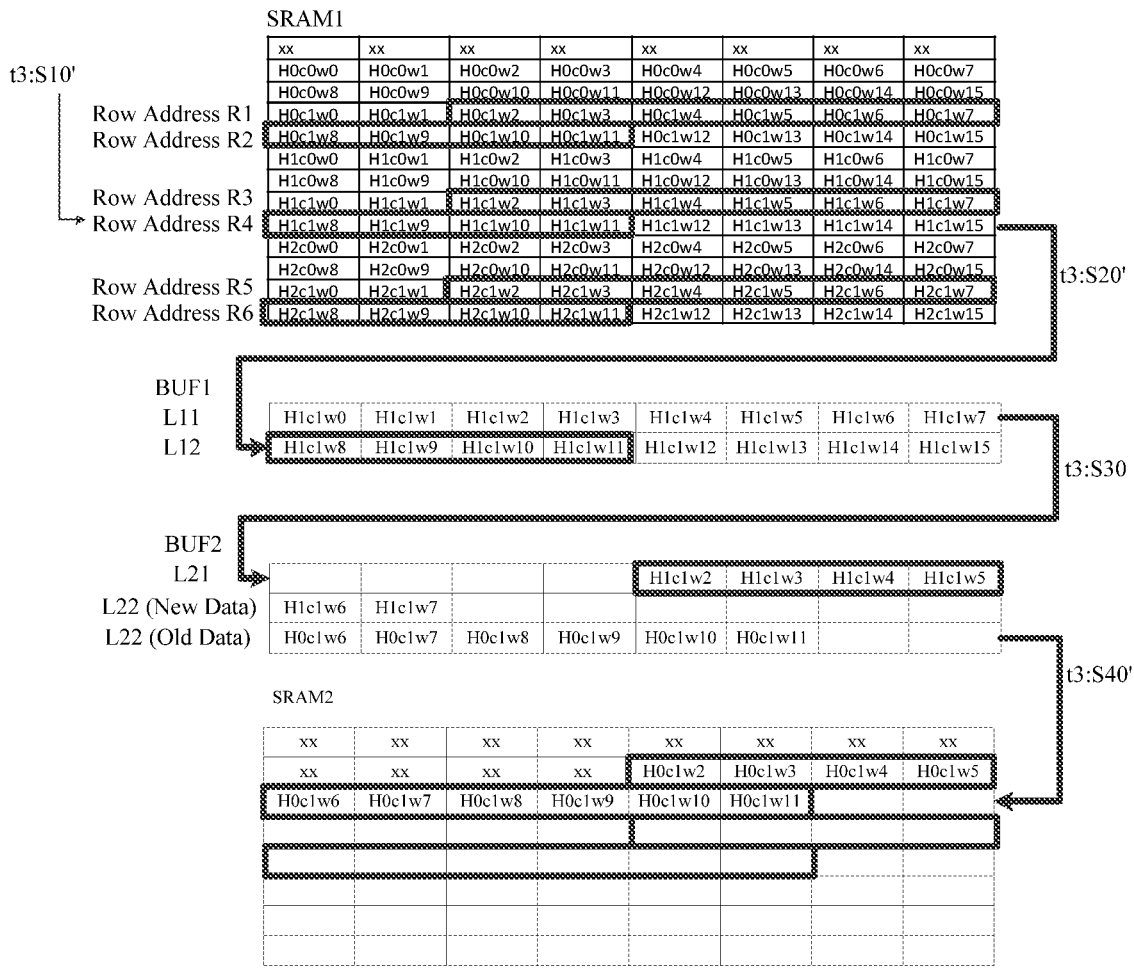
FIG. 16 shows an example method according to an embodiment.

As shown in FIG. 11 and FIG. 16, the step S40' may be performed during the time period t3 just following the time period t2, so as to store the data items (H0c1w6 to H0c1w11) in the second buffer row L22 of the second buffer BUF2 to the corresponding target locations in the second memory SRAM2. In parallel, the step S30 may be performed to move the data items (H1c1w2 to H1c1w7), which are in the first buffer row L11 of the first buffer BUF1 and belong to the data to be accessed, to at least the first buffer row L21 of the second buffer BUF2, wherein the new data items H1c1w6 and H1c1w7 occupy the second buffer row L22 of the second buffer BUF2. In such a case, the new data may be written into the second buffer BUF2 after reading the old data from the second buffer BUF2, or the second buffer BUF2 may be a buffer supporting writing new data and reading data within one read-write cycle. In parallel, as shown in FIG. 16, the steps S10' and S20' (not shown in FIG. 11) may be further performed to read or copy all data items at the row address R4 in the first memory SRAM1 to the second buffer row L12 of the first buffer BUF1.

Assuming that time T1 is required to perform the steps S10 and S20 or the step S10' and S20', time T2 is required to perform the step S30 or S30', and time T3 is required to perform the step S30 or S30', to process M row addresses of the first memory SRAM1, then it takes at least (M×T1+M×T2+M×T3) when performing the example method in a manner as shown in FIG. 7, and it takes (T1+T2+T3+max (T1,T2,T3)*(M−1)) when performing the example method in a pipelined way as shown in FIG. 12, wherein max( ) represents fetching the maximum. Usually, T1, T2, and T3 may be equal to one cycle. Thus, it takes at least 3M cycles when performing the example method in a manner as shown in FIG. 7, and (M+2) cycles when performing the example method in a pipelined way as shown in FIG. 11. The pipelined control flow may reduce the execution time of the controller CON significantly, so that an overall performance of the system may be improved and the power consumption may be reduced.

It is appreciated that the pipelined control flows as shown in FIG. 11 and FIG. 12 are examples. Other pipelined control flows may be adopted to perform the example method in the embodiments, which are not limited to the examples in FIG. 11 and FIG. 12.

In the example method of the embodiments, by means of suitable hardware structures (the first buffer BUF1, the second buffer BUF2) and an improved data flow control (the first memory SRAM1→the first buffer BUF1→the second buffer BUF2→the second memory SRAM2 and/or second memory SRAM2→the first buffer BUF1→second buffer BUF2→first memory SRAM1), the data part to be accessed may be acquired directly from the tensor data loaded into the on-chip memory in the expected data arrangement. Thus, the working load of main processor or controller may be reduced, the frequency of data exchange/transfer between the off-chip memory and the on-chip memory may be decreased, and the process efficiency may be improved by means of a pipelined manner, so that the performances of the AI chip may be improved and the power consumption of the AI chip may be reduced.

Further, in the example method in the embodiments, one row of data in the first memory SRAM1 are processed per cycle, so that a pipelined process may be supported through suitable hardware structures and improved data flow controls. Thus, data access efficiency within the AI chip may be improved, the performances of the AI chip may be improved and the power consumption of the AI chip may be reduced.

In another embodiment, before the above steps, the example method may further include receiving an instruction to access the tensor data, and parsing the instruction to determine one or more of data items to be accessed in the logical structure, the first row address, and target locations in the second memory SRAM2 of the data items to be accessed in the logical structure.

For example, the controller CON may receive the instruction to access the tensor data and the associated parameters via an instruction interface, which may be a port for receiving instructions input by user via an I/O device, or a port for coupling to the instruction bus, or the like.

For example, an operation code of the received instruction may instruct to obtain a part of data from the complete tensor data. Accordingly, an address code or parameter of the instruction may instruct one or more of the storage location of complete tensor data in the external memory DDR, the logical structure of the complete tensor data, the location of data to be access in the logical structure of the complete tensor data, and so on.

For example, the operation code of the received instruction may also instruct to configure the data items in the first memory SRAM1 (for example, data output from the other components in the system such as the convolutional calculation core) as a part of another complete tensor data. Accordingly, the address code or parameter of the instruction may instruct one or more of the storage locations of the data items in the first memory SRAM1, the logical structure of the another tensor data, the location of the data to be accessed in the logical structure of another complete tensor data, and so on.

Then, the controller CON may parse the received instruction, or may instruct a dedicated instruction parser to parse the received instruction, so as to determine the operation type and associated parameters of further processes according to the operation code of the instruction.

Accordingly, the controller CON may determine one or more of which data items in the external memory DDR or the first memory SRAM1 belong to the data to be accessed, row addresses of the data to be accessed (for example, the above first row address, second row address, and the like), the target locations in the second memory SRAM2 for the data items to be accessed, and so on.

For example, as described above, if the controller CON performs instructions or provide instructions to determine the first available storage region in the second memory SRAM2 as the target location in the second memory SRAM 2 for the data items, information determined by the controller CON does not have to include information such as the target locations in the second memory SRAM2 for the data items in the data to be accessed.

Further, when the operation code of the received instruction instruct to obtain a part of data from the complete tensor data, the example method in the embodiments may further include reading or loading at least a part of the complete tensor data from the external memory DDR to the first memory SRAM1.

The steps of the example method in the embodiments may be performed repeatedly (for example as shown in FIG. 5 to FIG. 7) or in a pipelined manner (for example as shown in FIG. 11).

Further, when the operation code of the received instruction instruct to configure the data items in the first memory SRAM1 as a part of another complete tensor data, the example method in the embodiments may further include outputting the data in the second memory SRAM2 to the external memory DDR.

In an embodiment, the received instruction may be a hardware instruction supportable by the system. After the controller CON receives the hardware instruction, the steps of the example method in the embodiments may be performed repeatedly (for example as shown in FIG. 5 to FIG. 7) or in a pipelined manner (for example as shown in FIG. 11), so as to access the tensor data efficiently.

Figure 17:
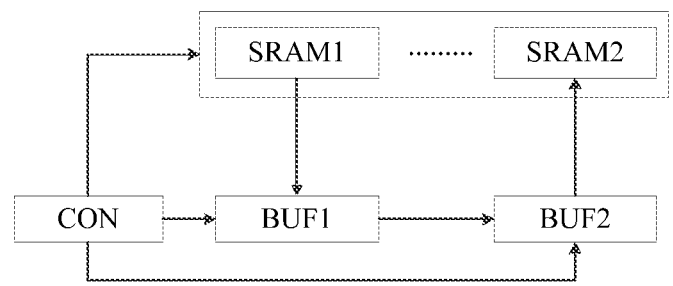
FIG. 17 shows an example apparatus according to an embodiment.

FIG. 17 shows an example apparatus for accessing tensor data in an embodiment. The example apparatus may include the first buffer BUF1, the second buffer BUF2, and the controller CON, wherein the controller CON may be coupled to the first memory SRAM1, the second memory SRAM2, the first buffer BUF1, and the second buffer BUF2.

In an embodiment, the controller CON may be configured to perform a predetermined instruction sequence when being activated so as to perform at least the example method in the embodiments. For example, the controller CON may be configured to perform the example method in the embodiments based on the instructions and according to any control flows as shown in FIG. 3 to FIG. 7 and FIG. 11.

In various embodiments, for example, in a case of an AU chip, the controller CON may be a processor or controller developed based on a GPU, an ARM processor, and a FPGA, and may also be an access controller or a data transfer controller on the chip dedicated to control the access to the off-chip memory and/or on-chip memory, such as a RISC soft processor core developed based on FPGA. Further, the controller CON in an embodiment may be configured to manage the data access to the off-chip memory and/or on-chip memory independently, and may also be configured to assist with the main processor or respond to the instructions from the main processor to manage the data access to the off-chip memory and/or on-chip memory.

Each of the first buffer BUF1 and the second buffer BUF2 may be a cache or a static random access memory, whose data access rate may match with the data access rates of the high speed storage system including the first memory SRAM1 and the second memory SRAM2.

In various embodiments, the first buffer BUF1 may include one or more buffer rows and the second buffer BUF2 may include two or more buffer rows.

In an embodiment, each of the first buffer BUF1 and the second buffer BUF2 may include at least two buffer rows so as to achieve an efficient data access.

In an embodiment, each of the first buffer BUF1 and the second buffer BUF2 may include two buffer rows so as to achieve an efficient data access through hardware structures of low cost. In the embodiment, at least the second buffer BUF2 of the first buffer BUF1 and the second buffer BUF2 may support reading old data and writing new data within one read-write cycle so as to avoid a possible read-write conflict as shown in FIG. 16.

In another embodiment, where the cost allows, each of the first buffer BUF1 and the second buffer BUF2 may include more than two (for example, three or four) buffer rows so as to avoid the possible read-write conflict as shown in FIG. 16.

Further, each of the first buffer BUF1 and the second buffer BUF2 may be a buffer which may be circularly addressed by buffer rows, so as to provide a borderless storage space and to simplify the storage controls.

In an embodiment, the capacity of each buffer row of the first buffer BUF1 may be the same with the total capacity of a plurality of storage units with the same row address in the first memory SRAM1 (i.e., the storage width of the first memory SRAM1), and the capacity of each buffer row of the second buffer BUF2 may be the same with the total capacity of a plurality of storage units with the same row address in the second memory SRAM2 (i.e., the storage width of the second memory SRAM2), so as to simplify the designation and to reduce the complexity of control logic.

In various embodiments, the first buffer BUF1 and the second buffer BUF2 may be configured outside or inside of the example apparatus in FIG. 17. For example, the example apparatus in the embodiments may either include or not include the first memory SRAM1 and the second memory SRAM2.

In various embodiments, each of the first memory SRAM1 and the second memory SRAM2 may be a static random access storage component/module or a high-speed buffer component/module supporting access to two-dimensional data and/or supporting two-dimensional access to data. For example, in a case of the AI chip, each of the first memory SRAM1 and the second memory SRAM2 may be any suitable type or form of memory which may be used to form at least a part of the on-chip memory.

Further, in various embodiments, the first memory SRAM1 and the second memory SRAM2 may be configured separately, for example, as shown in FIG. 1 or FIG. 17, and may also be two different parts of the same storage component/module which may support access to two-dimensional data, for example as shown in FIG. 2, where such storage component/module may include a plurality of one-dimensional static random access memories or one or more two-dimensional memories so as to support access to the two-dimensional data and/or two-dimensional access to data.

In an embodiment, for example, in a case of the AI chip, the first buffer BUF1, the second buffer BUF2, the controller CON, the first memory SRAM1, and the second memory SRAM2 may be embodied on one chip, so as to form at least a part of the storage system in the System on Chip (SoC).

In the example apparatus in the embodiments, one row of data in the first memory SRAM1 are processed within each cycle so that the data items to be accessed in the first memory SRAM1 may be obtained simply and efficiently while satisfying a requirement of data alignment of hardware. Then, the data items to be accessed may be stored into the second memory SRAM2 in a desired arrangement, so that during subsequent processes, for example, the convolutional calculation core for performing convolutional calculations may obtain expected data items efficiently and precisely, and at least during processing the data items already loaded into the first memory SRAM1, data exchange/transfer between the external memory DDR and the internal high speed storage system (including the first memory SRAM1 and second memory SRAM2) may be ignored, so that the performance of the AI chip may be improved and the power consumption of the AI chip may be reduced.

Further, when to merge or splice a plurality of partial tensor data, target locations of data items in the second memory SRAM2 may be determined according to the structure of the target tensor to be composed, then the merging or splicing the feature data may be implemented directly by the example method in the embodiments. Thus, at least the operations for merging or splicing tensor data by the controller CON may be omitted or simplified, and the working load of the controller CON may be reduced, so that the controller CON may work for other more controls and processes. Thus, the performance of the AI chip may be improved.

It is appreciated that the example apparatus for accessing tensor data in the embodiments is not limited to the example in FIG. 17. For example, the example apparatus in an embodiment may also include a crossbar and/or multiplexer or the like for interconnections among the on-chip components, so as to enable more efficient interactions among the on-chip components and to save more chip space. For example, the example apparatus in an embodiment may also include other components/modules/circuits/units/elements such as a timing controller for controlling instruction timings, an interruption controller for controlling instruction interruptions, which may be embodied on the same chip with the above first buffer BUF1. For example, the example apparatus in an embodiment may also include an instruction interface and/or an instruction parse circuit/module for receiving and parsing instructions related to data access.

In addition to the above methods and apparatus, embodiments of the present disclosure may also be a computer program product comprising computer program instructions. The computer program instructions, when being executed by a processor, cause the processor to execute the steps of the above method according to various embodiments of the present disclosure.

The computer program product may write program code for executing operations of embodiments of the present disclosure in any combination of one or more programming languages, said programming languages include object-oriented programming languages, such as Java, C++, etc., and conventional procedural programming languages, such as "C" language or similar programming languages. The program code may be executed entirely on user computing device, be partially executed on user device, be executed as a stand-alone software package, be partially executed on user computing device and be partially executed on remote computing device, or be entirely executed on remote computing device or server.

Furthermore, embodiments of the present disclosure may also be a computer readable storage medium having computer program instructions stored thereon. The computer program instructions, when being executed by a processor or controller (for example, the main processor or controller in the AI chip or the access controller for the on-chip storage system), cause the processor or controller to execute the steps of the above method in various embodiments of the present disclosure.

The computer-readable storage medium may use any combination of one or more readable media. The readable medium may be a readable signal medium or a readable storage medium. The computer-readable storage medium may include, but are not limited to, system, apparatus, or devices of electric, magnetic, optical, electromagnetic, infrared, or semiconductor, or any combination of the above. More examples (a non-exhaustive list) of readable storage medium include electrical connections with one or more wires, portable disks, hard disks, random access memory (RAM), read only memory (ROM), erasable programmable read only memory (EPROM or flash memory), optical fibers, portable compact disk read only memory (CD-ROM), optical storage devices, magnetic storage devices, or any suitable combination of the above.

The present disclosure has been described above in conjunction with the embodiments. However, it is appreciated that the advantages, superiorities, and effects and so on mentioned in the present disclosure are examples but not intended to limit the present invention, and these advantages, superiorities, effects and so on will not be considered as essential to the embodiments of the present disclosure. In addition, the details of the foregoing disclosure are only for illustration and ease of understanding but not for limitation, and the above details do not limit the application to be implemented in the details mentioned above.

The block diagrams of devices, apparatuses, equipments, systems referred to in the present disclosure are illustrative examples and are not intended to require or imply that the connections, arrangements, and configurations must be made in the manner shown in the block diagram. These devices, apparatuses, equipments, systems, may be connected, arranged, or configured in any manner. Terms such as "including", comprising", "having" and the like are open words, which means "including, but not limited to" and may be used interchangeably. The terms "or" and "and" as used herein refer to the term "and/or" and may be used interchangeably, unless the context clearly dictates otherwise. The term "such as" as used herein refers to the phrase "such as but not limited to" and is used interchangeably.

The modifiers without quantifiers, such as "first" and "second", may be used for distinguish different elements, components, circuits, modules, apparatuses, or steps, rather than to emphasize order, positional relationship, importance, priority, or the like. For example, "the first memory SRAM1" may also be called as "the second memory SRAM1" while "the second memory SRAM2" may also be called as "the first memory SRAM2". For example, "the third row address" may also be called as "the first row address", and "the fourth row address" may also be called as "the second row address", and so on. In other words, modifiers without quantifiers such as "first" and "second" may be interchangeable.

The modifiers with quantifiers, such as "the first one" and "the second one", may be used to emphasize order, positional relationship, importance, priority, and so on, of different elements, components, circuits, modules, apparatuses, or steps. For example, "the first one available location" may mean all the locations before this location are unavailable, and compared with the other locations, this location is an available found initially, or this location is the head in the storage space or in the searching order. For example, "the second one available location" may mean that there is one available location before this available location. In other words, modifiers without quantifiers such as "first one" and "second one" may be not interchangeable.

In addition, "one or more" may indicate one or two or three or more, while "two or more" may mean two or three or more. "A plurality of" or "more" used individually may indicate "two or more" or "above two".

It is also appreciated that in the apparatuses, equipments, and methods of the present disclosure, each component or step may be decomposed and/or recombined. These decompositions and/or recombination should be regarded as an equivalent of the present disclosure.

The above description of the disclosed aspects is provided to enable to make or use the application. Various modifications to these aspects may be made. Therefore, the present disclosure is not intended to be limited to the aspects shown herein, but rather to present the broadest scope consistent with the principles and novel features disclosed herein.

The above description has been provided for illustration and description. In addition, the description is not intended to limit the embodiments of the present disclosure to the forms disclosed herein. Although various example aspects and embodiments have been discussed above, some variations, modifications, alterations, additions and sub-combinations thereof may be recognized.

What is claimed is:

1. A method for accessing tensor data, comprising:
   determining a first row address in a first memory, one or more first data items to be accessed in a logical structure of the tensor data being stored at the first row address in the first memory;
   copying data items at the first row address in the first memory to a first buffer row of a first buffer;
   moving each first data item in the first buffer row of the first buffer to a corresponding location at least in a first buffer row of a second buffer, the corresponding location at least in the first buffer row of the second buffer for each first data item depending on a target location in a second memory allocated to the first data item; and
   storing data items in the first buffer row of the second buffer into corresponding target locations in the second memory.

2. The method of claim 1, further comprising:
   in a case of a second buffer row of the second buffer including at least one first data item, storing each first data item in the second buffer row of the second buffer into the corresponding target location in the second memory,
   in the first memory, each first data item in the second buffer row of the second buffer being located after each first data item in the first buffer row of the second buffer.

3. The method of claim 1, further comprising:
   determining a second row address of the first memory, one or more second data items to be accessed in the logical structure of the tensor data being stored at the second row address in the first memory;
   copying data items at the second row address in the first memory to a second buffer row of the first buffer;
   moving each second data item in the second buffer row of the first buffer to a corresponding location at least in a second buffer row of the second buffer, the corresponding location at least in the second buffer row of the second buffer for each second data item depending on a target location in the second memory allocated to the second data item; and
   storing data items in the second buffer row of the second buffer into corresponding target locations in the second memory.

4. The method of claim 3, further comprising:
   in a case of the first buffer row of the second buffer including at least one second data item, storing each second data item in the first buffer row of the second buffer into the corresponding target location in the second memory,
   in the first memory, each second data item in the first buffer row of the second buffer being located after each second data item in the second buffer row of the second buffer.

5. The method of claim 3, wherein the moving each second data item in the second buffer row of the first buffer to the corresponding location at least in the second buffer row of the second buffer comprises:
   in parallel with or after storing data items in the first buffer row of the second buffer into corresponding target locations in the second memory, moving each second data item in the second buffer row of the first buffer to the corresponding location at least in the second buffer row of the second buffer.

6. The method of claim 1, further comprising:
   receiving an instruction to access the tensor data; and
   determining one or more of data items to be accessed in the logical structure, the first row address, and target locations in the second memory of the data items to be accessed in the logical structure, by parsing the instruction.

7. The method of claim 2, further comprising:
   receiving an instruction to access the tensor data; and
   determining one or more of data items to be accessed in the logical structure, the first row address, and target locations in the second memory of the data items to be accessed in the logical structure, by parsing the instruction.

8. The method of claim 3, further comprising:
   receiving an instruction to access the tensor data; and
   determining one or more of data items to be accessed in the logical structure, the first row address, and target locations in the second memory of the data items to be accessed in the logical structure, by parsing the instruction.

9. The method of claim 4, further comprising:
   receiving an instruction to access the tensor data; and
   determining one or more of data items to be accessed in the logical structure, the first row address, and target locations in the second memory of the data items to be accessed in the logical structure, by parsing the instruction.

10. The method of claim 5, further comprising:
    receiving an instruction to access the tensor data; and
    determining one or more of data items to be accessed in the logical structure, the first row address, and target locations in the second memory of the data items to be accessed in the logical structure, by parsing the instruction.

11. An apparatus for accessing tensor data, comprising:
    a first buffer;
    a second buffer; and
    a controller, the controller being coupled to a first memory, a second memory, the first buffer, and the second buffer, the controller being configured to perform
       determining a first row address in a first memory, one or more first data items to be accessed in a logical structure of the tensor data being stored at the first row address in the first memory,
       copying data items at the first row address in the first memory to a first buffer row of a first buffer,
       moving each first data item in the first buffer row of the first buffer to a corresponding location at least in a first buffer row of a second buffer, the corresponding location at least in the first buffer row of the second buffer for each first data item depending on a target location in a second memory allocated to the first data item, and
       storing data items in the first buffer row of the second buffer into corresponding target locations in the second memory.

12. The apparatus of claim 11, wherein a capacity of each buffer row of the first buffer is same with a total capacity of a plurality of storage units with same row address in the first memory, and wherein a capacity of each buffer row of the second buffer is same with a total capacity of a plurality of storage units with same row address in the second memory.

13. The apparatus of claim 11, wherein both the first buffer and the second buffer are circularly addressed by buffer rows.

14. The apparatus of claim 11, wherein the controller is further configured to perform in a case of a second buffer row of the second buffer including at least one first data item, storing each first data item in the second buffer row of the second buffer into the corresponding target location in the second memory, in the first memory, each first data item in the second buffer row of the second buffer being located after each first data item in the first buffer row of the second buffer.

15. The apparatus of claim 11, wherein the controller is further configured to perform determining a second row address of the first memory, one or more second data items to be accessed in the logical structure of the tensor data being stored at the second row address in the first memory;

copying data items at the second row address in the first memory to a second buffer row of the first buffer;

moving each second data item in the second buffer row of the first buffer to a corresponding location at least in a second buffer row of the second buffer, the corresponding location at least in the second buffer row of the second buffer for each second data item depending on a target location in the second memory allocated to the second data item; and storing data items in the second buffer row of the second buffer into corresponding target locations in the second memory.

16. The apparatus of claim 15, wherein the controller is further configured to perform in a case of the first buffer row of the second buffer including at least one second data item, storing each second data item in the first buffer row of the second buffer into the corresponding target location in the second memory, in the first memory, each second data item in the first buffer row of the second buffer being located after each second data item in the second buffer row of the second buffer.

17. The apparatus of claim 15, wherein the controller is further configured to perform in parallel with or after storing data items in the first buffer row of the second buffer into corresponding target locations in the second memory, moving each second data item in the second buffer row of the first buffer to the corresponding location at least in the second buffer row of the second buffer.

18. The apparatus of claim 11, wherein the controller is further configured to perform receiving an instruction to access the tensor data; and determining one or more of data items to be accessed in the logical structure, the first row address, and target locations in the second memory of the data items to be accessed in the logical structure, by parsing the instruction.

19. The apparatus of claim 12, wherein the controller is further configured to perform receiving an instruction to access the tensor data; and determining one or more of data items to be accessed in the logical structure, the first row address, and target locations in the second memory of the data items to be accessed in the logical structure, by parsing the instruction.

20. The apparatus of claim 13, wherein the controller is further configured to perform receiving an instruction to access the tensor data; and determining one or more of data items to be accessed in the logical structure, the first row address, and target locations in the second memory of the data items to be accessed in the logical structure, by parsing the instruction.

* * * * *